Dec. 28, 1948.                    C. R. HANNA ET AL                    2,457,228
                          LEVELING AND TRAINING MECHANISM
Filed March 1, 1944                                             16 Sheets-Sheet 3

INVENTORS
CLINTON R. HANNA and
LAWRENCE B. LYNN
BY
ATTORNEY

Dec. 28, 1948.  C. R. HANNA ET AL  2,457,228
LEVELING AND TRAINING MECHANISM
Filed March 1, 1944  16 Sheets-Sheet 5

INVENTORS
CLINTON R. HANNA and
LAWRENCE B. LYNN
BY
ATTORNEY

Dec. 28, 1948.  C. R. HANNA ET AL  2,457,228
LEVELING AND TRAINING MECHANISM
Filed March 1, 1944   16 Sheets-Sheet 7

WITNESSES:
James K. Mosser
E. H. Lutz

INVENTORS
CLINTON R. HANNA and
LAWRENCE B. LYNN
BY
A. B. Rivers
ATTORNEY

Dec. 28, 1948.  C. R. HANNA ET AL  2,457,228
LEVELING AND TRAINING MECHANISM
Filed March 1, 1944  16 Sheets-Sheet 9

INVENTORS
CLINTON R. HANNA and
LAWRENCE B. LYNN
BY
ATTORNEY

Dec. 28, 1948.  C. R. HANNA ET AL  2,457,228
LEVELING AND TRAINING MECHANISM
Filed March 1, 1944  16 Sheets-Sheet 10

WITNESSES:

INVENTORS
CLINTON R. HANNA and
LAWRENCE B. LYNN
BY
ATTORNEY

Dec. 28, 1948.    C. R. HANNA ET AL    2,457,228
LEVELING AND TRAINING MECHANISM
Filed March 1, 1944    16 Sheets-Sheet 13
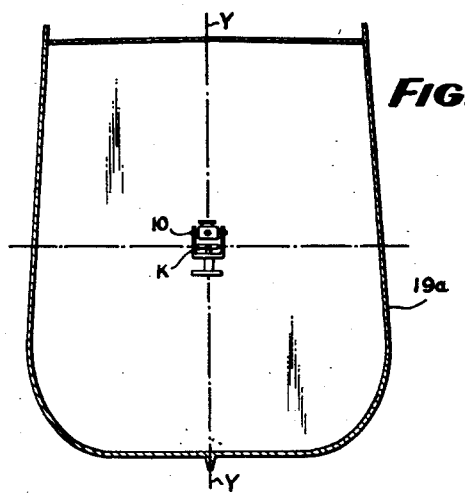
FIG. 23
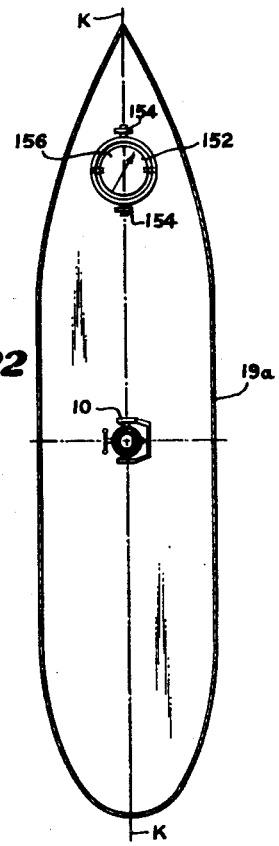
FIG. 22
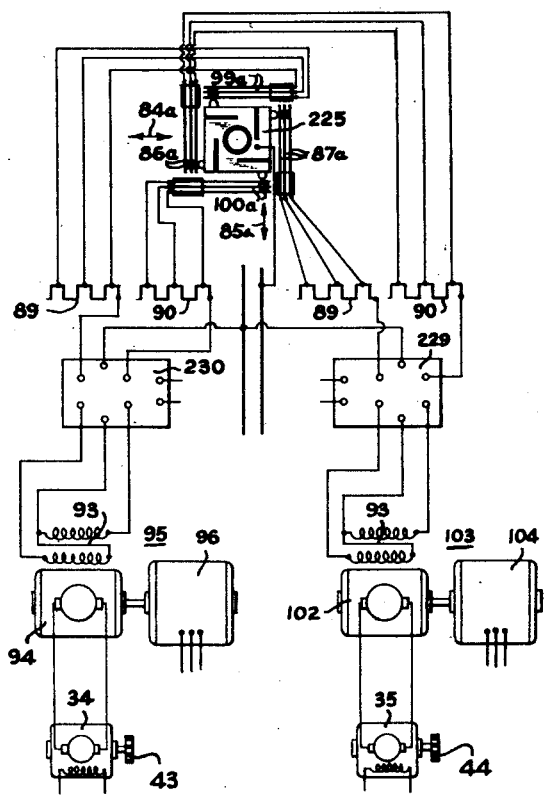
FIG. 27
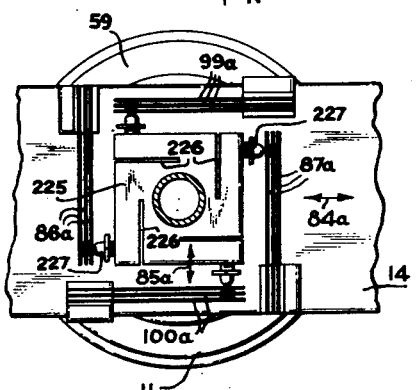
FIG. 26
WITNESSES:
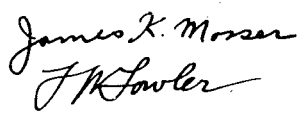
INVENTORS
CLINTON R. HANNA and
LAWRENCE B. LYNN
BY a. B. Revere
ATTORNEY INVENTORS
CLINTON R. HANNA and
LAWRENCE B. LYNN
BY
ATTORNEY Dec. 28, 1948.  C. R. HANNA ET AL  2,457,228
LEVELING AND TRAINING MECHANISM
Filed March 1, 1944   16 Sheets-Sheet 16
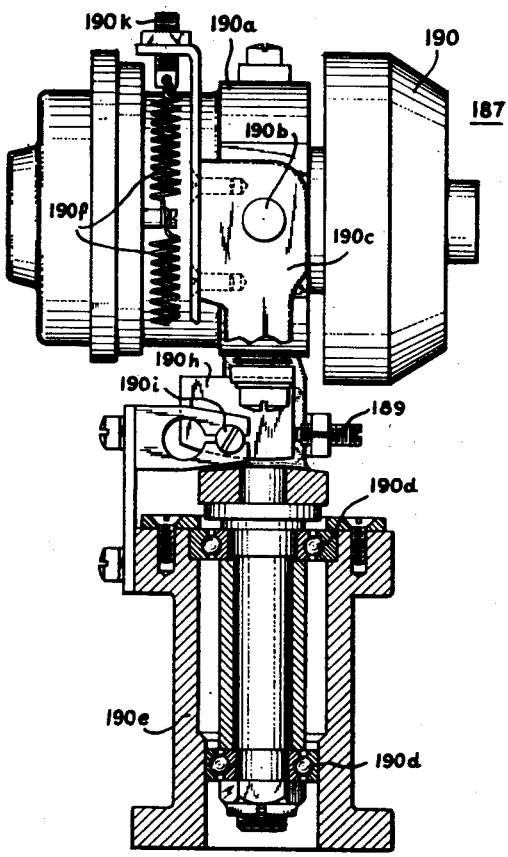
FIG. 31
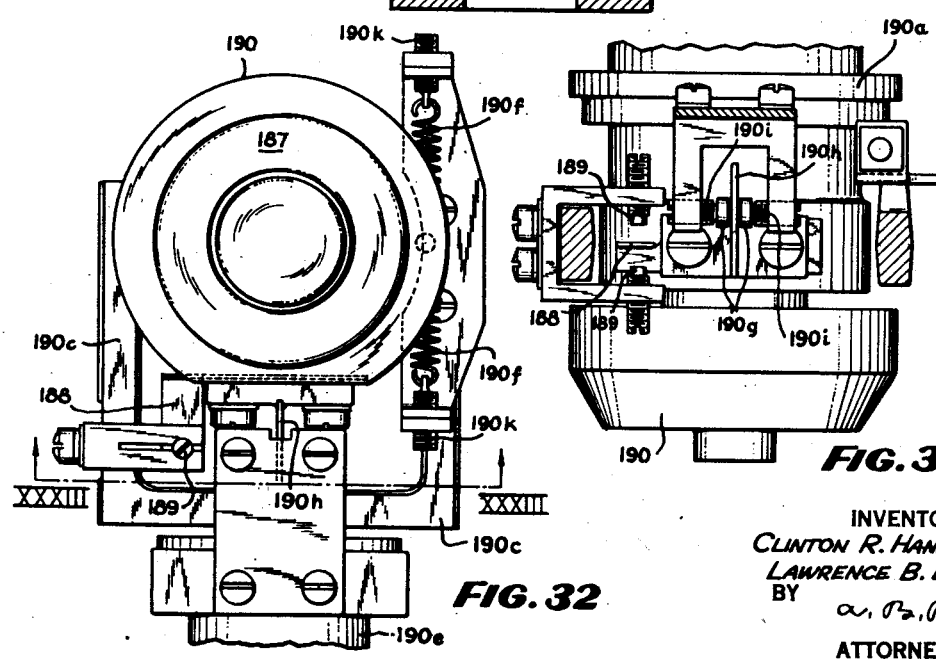
FIG. 32
FIG. 33
INVENTOR
CLINTON R. HANNA and
LAWRENCE B. LYNN
BY
ATTORNEY Patented Dec. 28, 1948

2,457,228

UNITED STATES PATENT OFFICE 2,457,228

LEVELING AND TRAINING MECHANISM

Clinton R. Hanna, Pittsburgh, and Lawrence B. Lynn, Wilkinsburg, Pa., assignors to Westinghouse Electric Corporation, East Pittsburgh, Pa., a corporation of Pennsylvania Application March 1, 1944, Serial No. 524,560

32 Claims. (Cl. 318—19)

The invention relates to a stable element or a leveling and training mechanism wherein a member, such as a phantom or level movable in train, is maintained in level condition with its pivot axis horizontal by means controlled by a reference vertical, and it has for an object to provide improved apparatus effective to attain this result irrespective of variations in inclination of the training axis with respect to the vertical.

A further object of the invention is to provide, in a self-contained and mechanically-simplified stable element or leveling and training mechanism wherein a cross-level is pivotally carried by a yoke and pivotally carries a level, a gyro vertical controlling servo-motor means including reversible cross-level and level motors carried by the yoke and by the cross level for moving the cross level and the level about their axes and means including a motor for driving the yoke about the train axis.

Still another object of the invention is to provide a stable element of the above character having transmitters carried by the mounting means for the yoke and by the yoke or by the mounting means for the yoke, by the yoke, and by the cross level for transmitting training, cross level, and level movements to any other suitable device or devices such as antenna, guns and the like.

A further object of the invention is to provide improved means for controlling the position in train of the stable element.

Another object of the invention is to provide a stable element and a compass for controlling its position in train together with means effective to compensate for roll and pitch, whereby the level may be maintained in level condition with its axis horizontal and with its position in azimuth held in agreement with the compass.

A further object of the invention is to provide a stable element having a level maintained in level condition with its axis horizontal by servo-motor means controlled by a gyro vertical, and wherein compensation for roll and pitch makes it possible to keep the level and the compass in agreement in azimuth, together with a sighting device operative to effect training movement to any desired extent so that adjustment in train may be had in relation to the compass, whereby an object may be sighted and the line of sight maintained, irrespective of motion of the ship.

A further object of the invention is to provide a gyro vertical controlling servo-motor means to move the cross level and the level about their axes to position the level and wherein the gyro is of the neutral, three-degree freedom type having a spin axis and inner and outer tilt or gimbal axes, with the inner tilt axis arranged at right angles to the spin axis and to the other tilt axis, together with means for suspending the gyro in relation to the cross level and level axes so that the tilt and spin axes intersect on the train axis defined by the intersection of normal planes containing the cross level and level axes.

A further object of the invention is to provide a stable element having a gyro vertical operative to maintain the level vertical, together with means for supporting the gyro so that the intersection of the gyro axes is coincident with the intersection of the cross level and level axes.

Another object of the invention is to provide a gyro supported so that its tilt and spin axes intersect at the train axis defined by the intersection of normal planes containing the cross level and level axes, together with pilot or pick-up means operated by movements about the cross level and level axes, or in level axis and cross level axis planes, relative to the gyro to secure follow-up operation of motors for moving the cross level and the level about their axes to position the level or maintain the latter in level condition with its axis horizontal.

A further object of the invention is to provide a vertical reference gyro supported by means of level or phantom, cross level or phantom ring and yoke members, the yoke member being mounted for training movement on a ship or the like at or near the roll axis and being rotatable by a motor about an axis substantially normal in relation to the deck, the cross level member pivotally supporting the level member or phantom and being pivotally supported by the yoke member about transverse axes, with the cross level axis normal to the level axis and to the yoke axis and the gyro controlled motors carried by the yoke and the cross level member for tilting the cross level member and the level member or phantom, respectively, about their axes to position the phantom, that is, to maintain a predetermined level or phantom pivot axis plane normal to the gyro spin axis, or, with the gyro spin axis vertical, the level or phantom is maintained in level condition with its axis horizontal, together with synchro-generators or transmitters carried by the cross level, the yoke, and the yoke pedestal and energized in response to angular movements of the level or phantom, the cross level or phantom ring, and the yoke, respectively, or with synchro-generators carried by the yoke and the yoke pedestal and energized in response to angular movement of the cross level or phantom ring and the yoke, respectively.

A further object of the invention is to provide apparatus of the above character with means for advancing and retarding the yoke member rotating in train to correct or compensate for variations caused by deck tilting, so that the direction in train is in azimuth with respect to the vertical instead of an axis perpendicular to the ship's deck with the cross level and level members moved with respect to their axes to keep the level member or members positioned horizontally.

A further object of the invention is to provide a deck tilt corrector for apparatus of the above character and which comprises a first component carried by the stable element and a second component carried by the ship, the components including universally-mounted members maintained in parallel relation to the level member of the stable element and pivotally connected by means sensitive to variations in angular movements about the pivot axis caused by roll and pitch and operative to compensate for errors otherwise existing in the train angle on account of roll and pitch.

A more particular object of the invention is to provide a deck tilt corrector comprising a stable element component, including a member pivotally supported from the yoke for movement about axes parallel to the cross level and level pivot axes and connected to the level so that it is at all times positioned in parallelism with the latter, and a second component, including a member pivotally supported about axes parallel to the keel axis and an athwartship axis normal thereto, together with means responsive to variations in angular movement of the members caused by roll and pitch to move the yoke of the stable element sufficiently to compensate for errors otherwise existing in the train angle on account of roll and pitch.

A further object of the invention is to provide a stable element wherein the level is positioned by servo-motor means effective about the cross level and level axes and controlled by a gyro having its tilt axes arranged in normal planes intersecting at the training axis, with the intersections of the gyro axes and of the cross level and level axes at a common point on the training axis, together with a deck tilt corrector including a pair of pivotally-connected members, one of the members being pivotally connected to the yoke through inner and outer axes located in said normal intersecting planes, with the outer axis maintained parallel to the cross level axis and the inner axis maintained parallel to the level axis, and the other member pivotally connected to the ship through inner and outer axes which intersect normally at the training axis.

Another object of the invention is to provide for training of the stable element by a servomotor system controlled by electrical means which is varied in response to roll and pitch to effect follow-up operation of the system in order to correct the train angle for roll and pitch.

Yet another object of the invention is to provide a deck tilt corrector, having the aforesaid yoke and ship components, and a compass, both the ship component and the compass having gimbal axes parallel to the keel axis and gimbal axes normal to the keel axis, together with means controlling the yoke azimuth or training motor in response to the compass and to the deck tilt corrector.

A further object of the invention is to provide a member which is manually operable to effect energization of the azimuth or training motor for the yoke, together with a follow-up connection between the stable element trained by the motor and the manually-operable member to assure of movement of the yoke to the same extent as the member is moved.

A further object of the invention is to provide for continuous operation of the azimuth or training motor over a suitable speed range to provide for a desired velocity of training or scanning movement.

A further object of the invention is to provide a neutral gyro, including a rotor and having an outer tilt or gimbal axis and an inner tilt or gimbal axis normal both to the outer tilt axis and to the spin axis, together with a pendulously-supported erector operative, in the event of departure of the spin axis from vertical, to cause the application of a couple to the gyro so that the resulting precession restores the spin axis to vertical, the erector being pendulously supported about axes at right angles, with one of the latter axes coincident with said outer tilt axis of the gyro so that the center of the gyro system is coincident with that of the pendulous system.

As the electro-magnetic coupling between the pendulous ball of the erector and the gyro constitutes the means by which the ball provides a vertical reference for the gyro and as the coupling is a loose one, the gyro is influenced only by the average position of the pendulous ball and is, therefore, not subject to linear accelerations resulting from rolling or pitching of the ship; however, when the ship makes a turn, and a constant radial acceleration exists for a period of time, the average position of the pendulum or ball is in error. Therefore, a further object of the invention is to provide apparatus of this character with means responsive to ship turning velocity of desired minimum magnitude and duration to de-energize the erecting magnet to avoid deflection of the gyro from vertical.

A further object of the invention is to provide magnetic means carried by the level for exerting force on the gyro together with means utilizing a compass and taking into account training movement of the stable element so that the magnetic means may be maintained positioned in a north-south plane so as to exert force on the gyro to cause precession of the latter in the east-west plane at an angular rate equal to that of earth's rotation to maintain the spin axis in the vertical.

A further object of the invention is to provide a gyro having earth's rotation correcting apparatus of the character just described with means for varying the correcting magnetic force to suit the latitude.

A further object of the invention is to damp nutational motion of the gyro.

A further object of the invention is to provide a stable element including level and cross level members tiltable about supporting axes and movable in train in response to a compass and a deck tilt corrector so that the level, cross level and train angles transmitted will be correct for conditions of roll, pitch and yaw of the ship.

Yet another object of the invention is to provide a stable element including level and cross level members tiltable about supporting axes and movable in train in response to a compass and a deck tilt corrector so that the level, cross level and train angles transmitted will be correct for conditions of roll, pitch and yaw of the ship together with supplementary means providing for manual training of the stable element to a desired true azimuth bearing in relation to the compass.

These and other objects are effected by the invention as will be apparent from the following description and claims taken in connection with the accompanying drawings, forming a part of this application, in which:

Fig. 12 is a detail view of the nutational chamber;

Figs. 13 and 14 are detail views showing controlling motor dampers;

Figure 1:
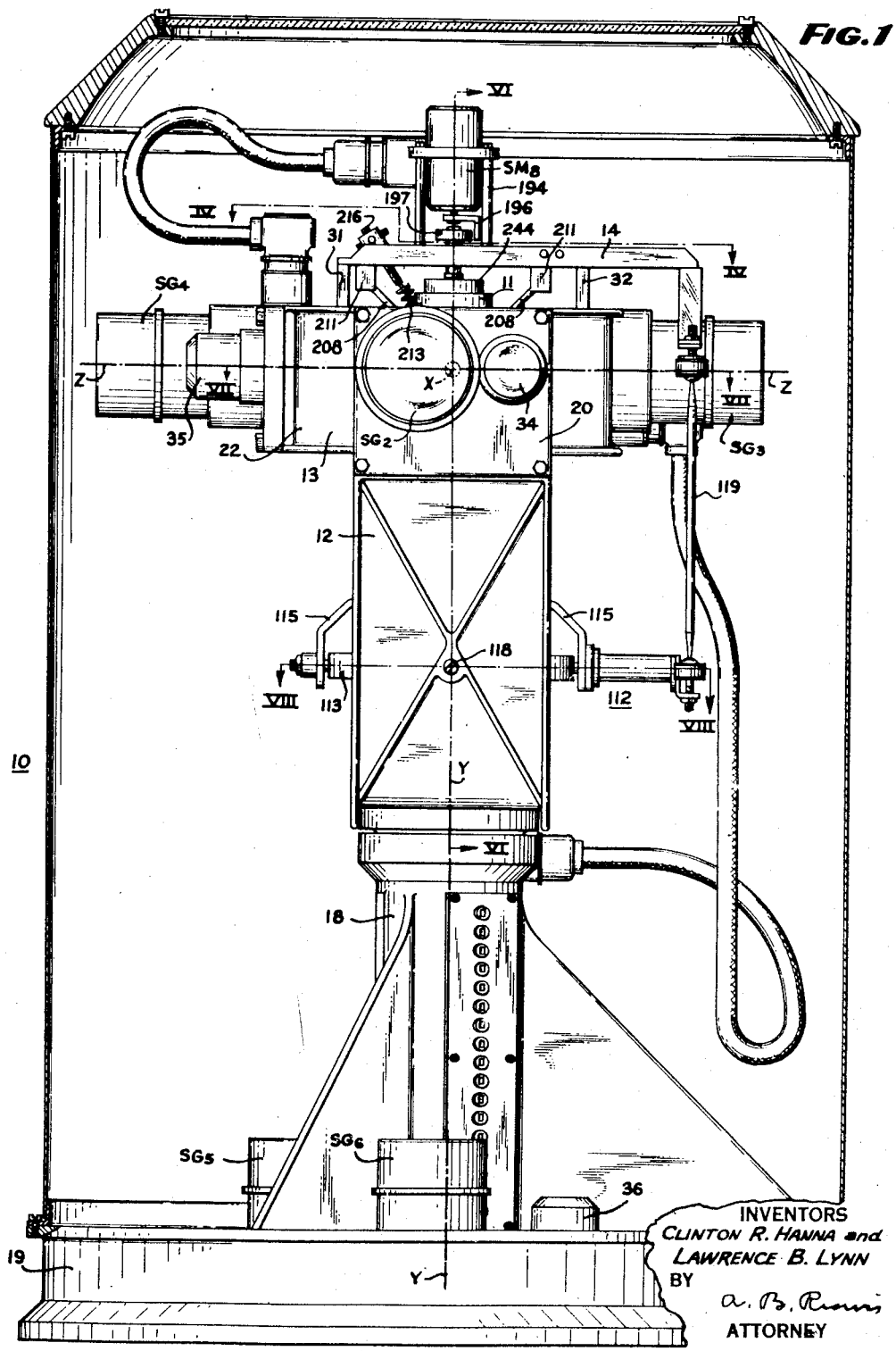
Figs. 1 and 2 are side elevational views of the stable element, Fig. 2 being at right angles to Fig. 1.
Figure 2:
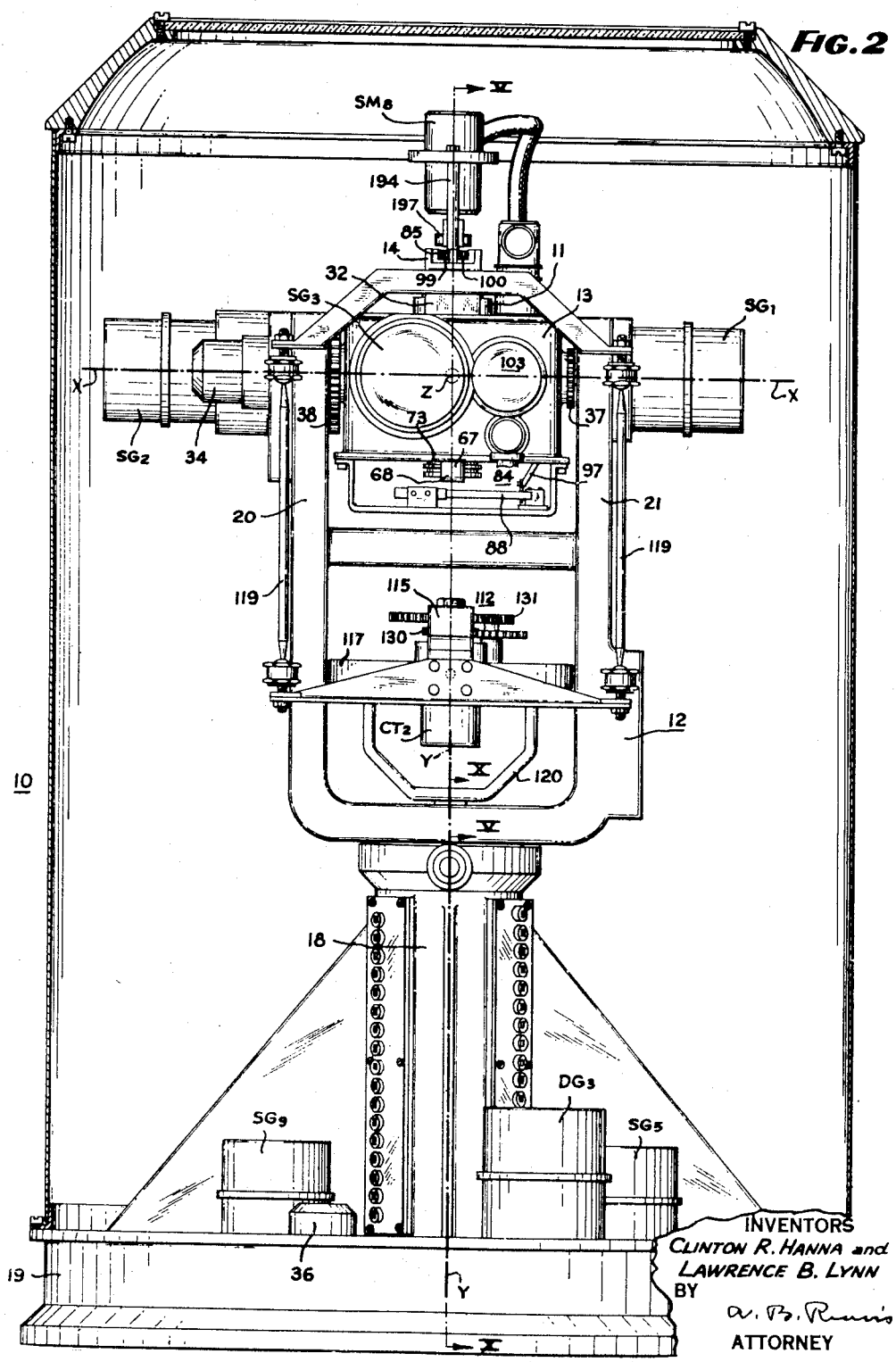
Figure 3:
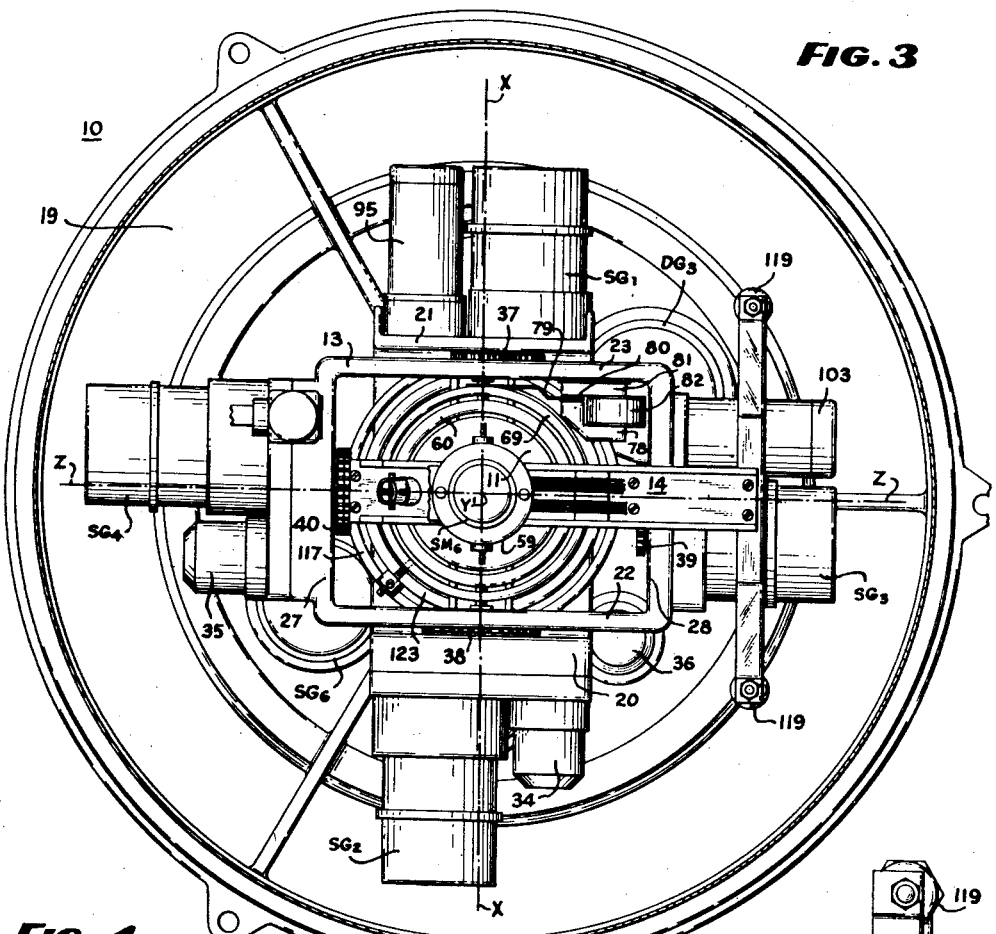
Fig. 3 is a top plan view of the stable element as seen with the casing cover removed.
Figure 4:
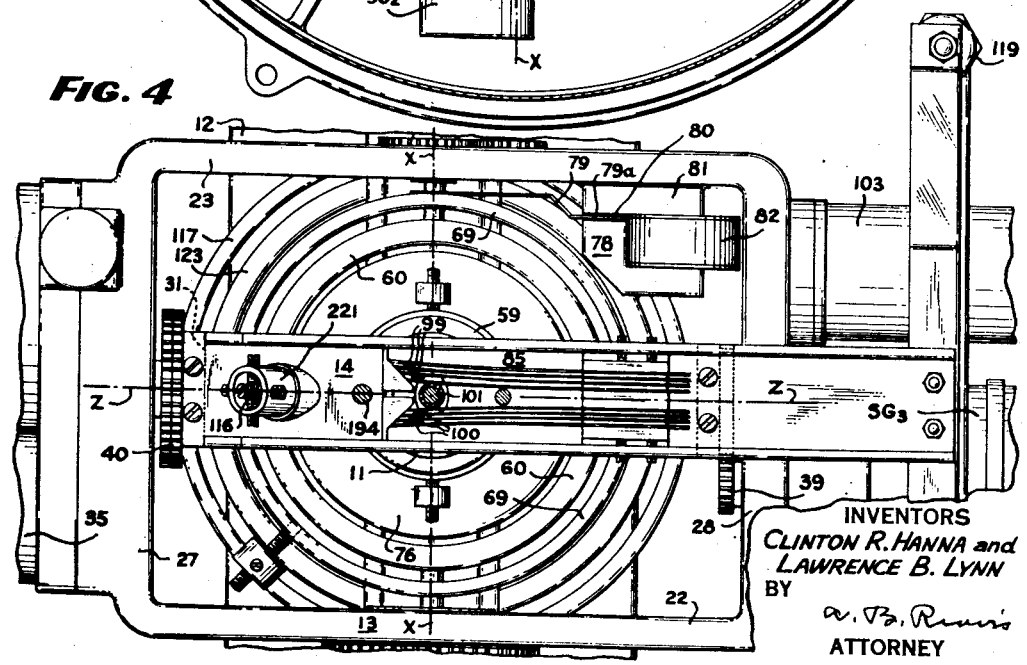
Fig. 4 is a sectional view taken along the line IV—IV of Fig. 1 and showing fragmentarily the stable element in plan.
Figure 5:
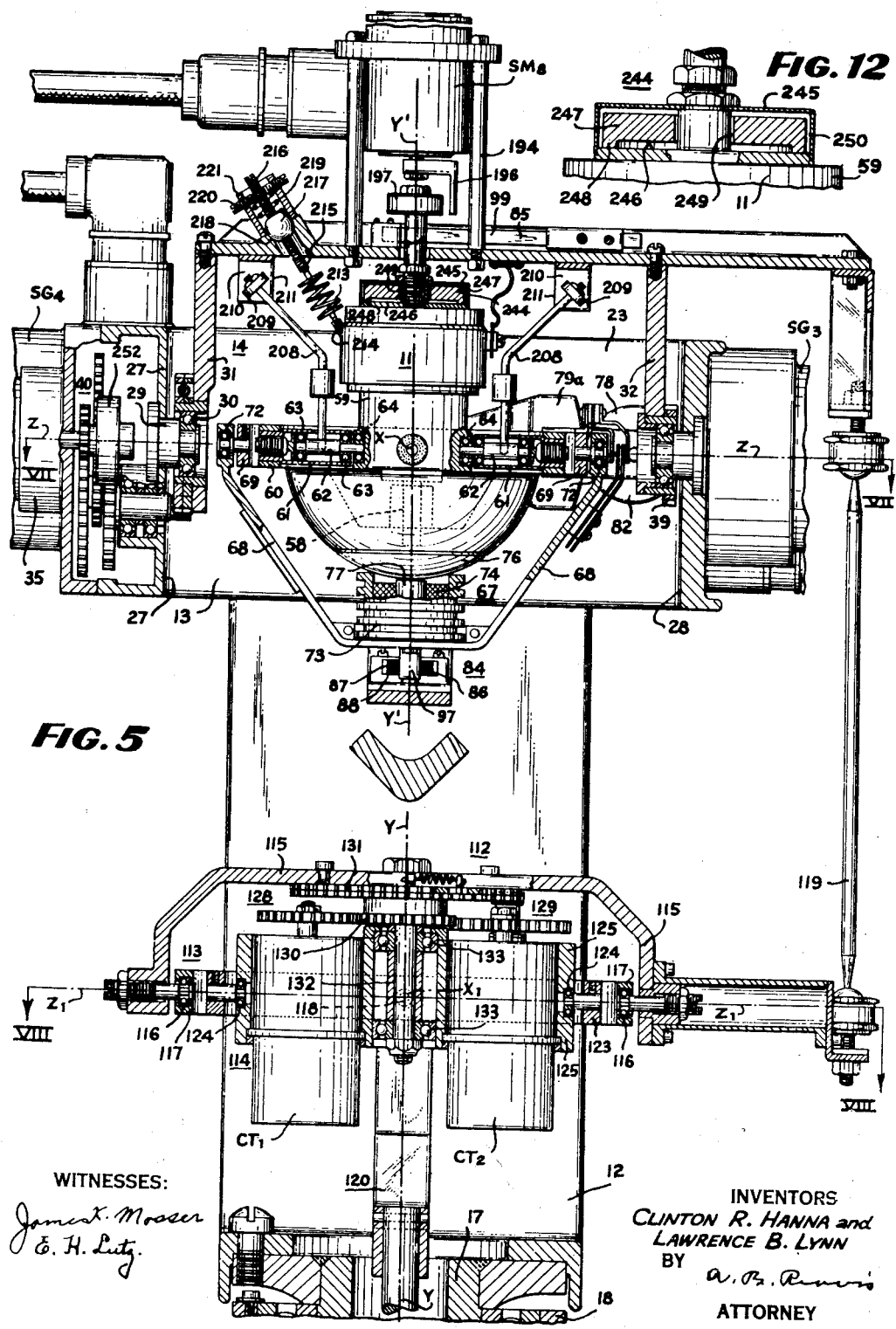
Fig. 5 is a vertical sectional view taken along the line V—V of Fig. 2.
Figures 15, 16, 17:
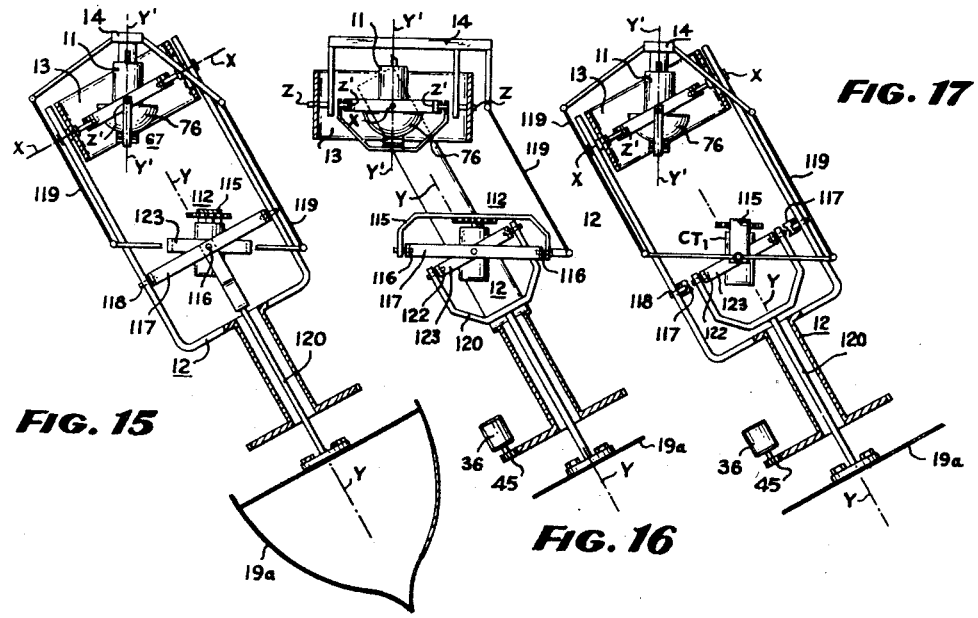
Figures 18, 19, 20:
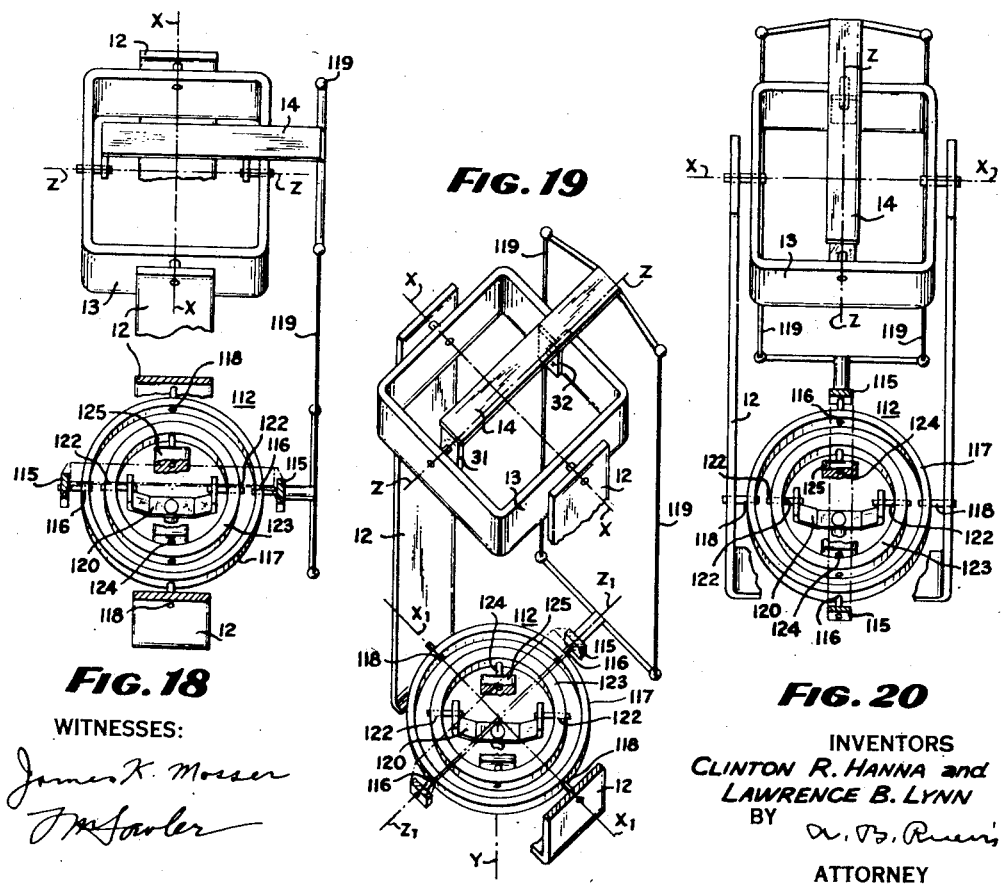
Figure 21:
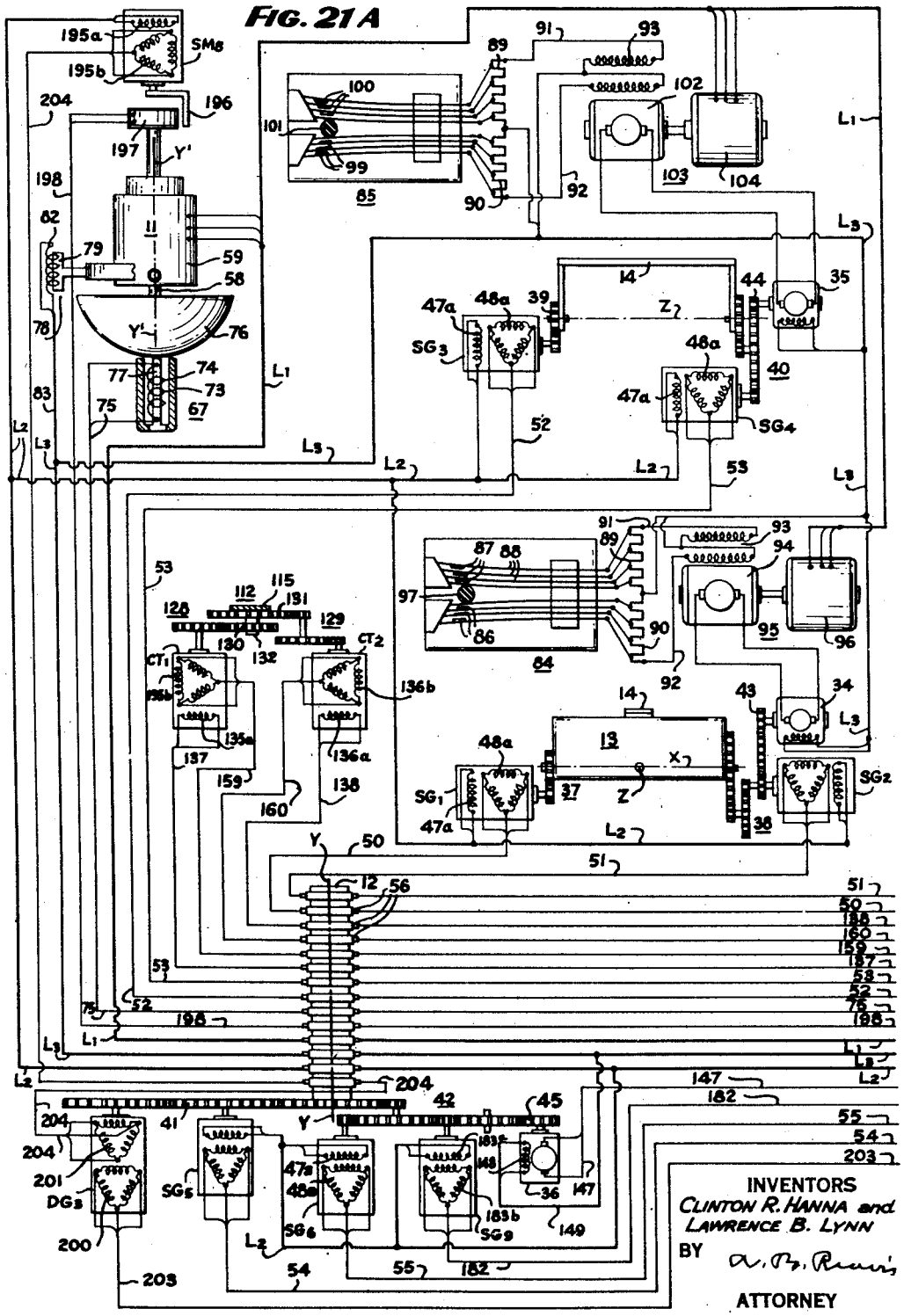
Figure 22:
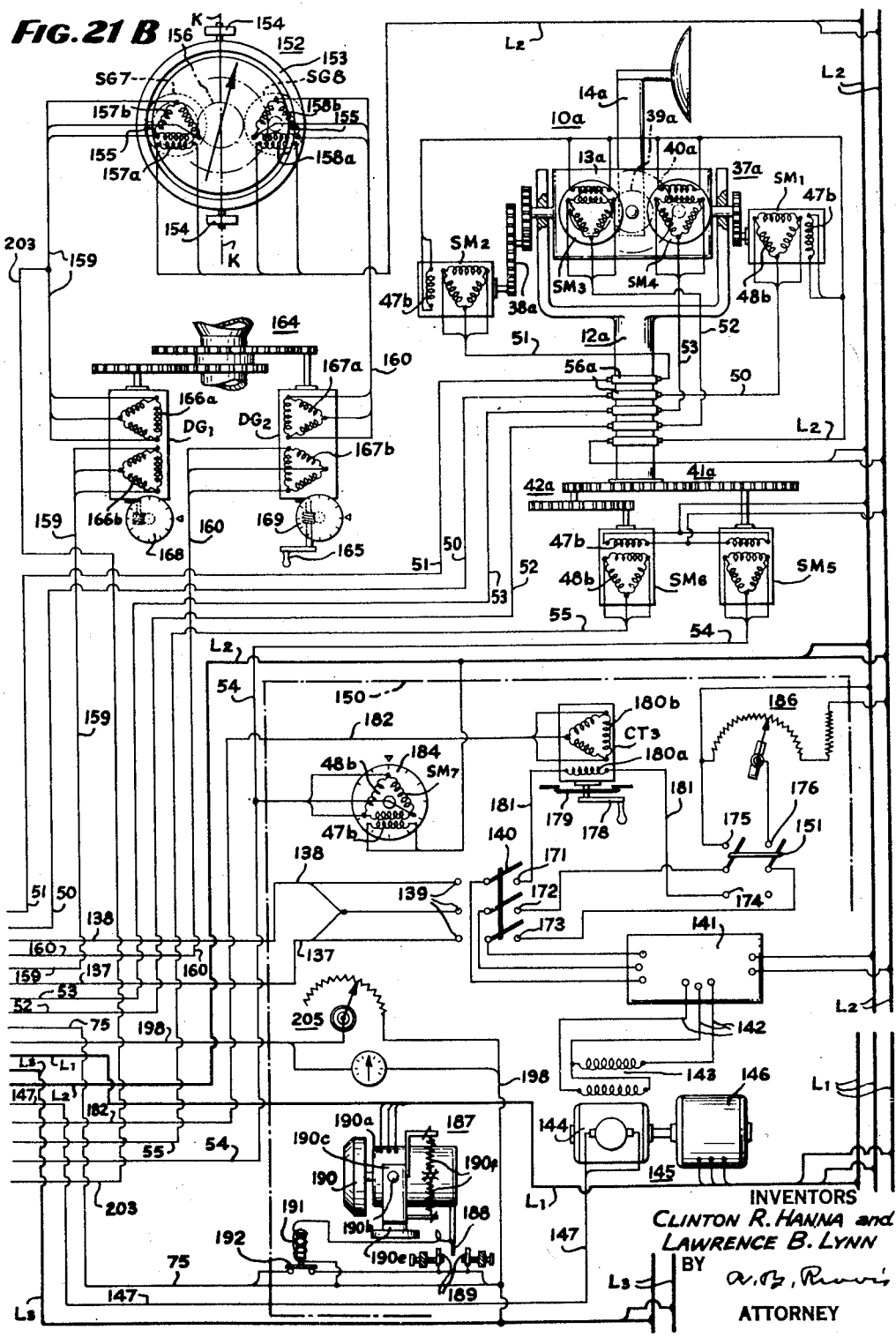
Figure 27:
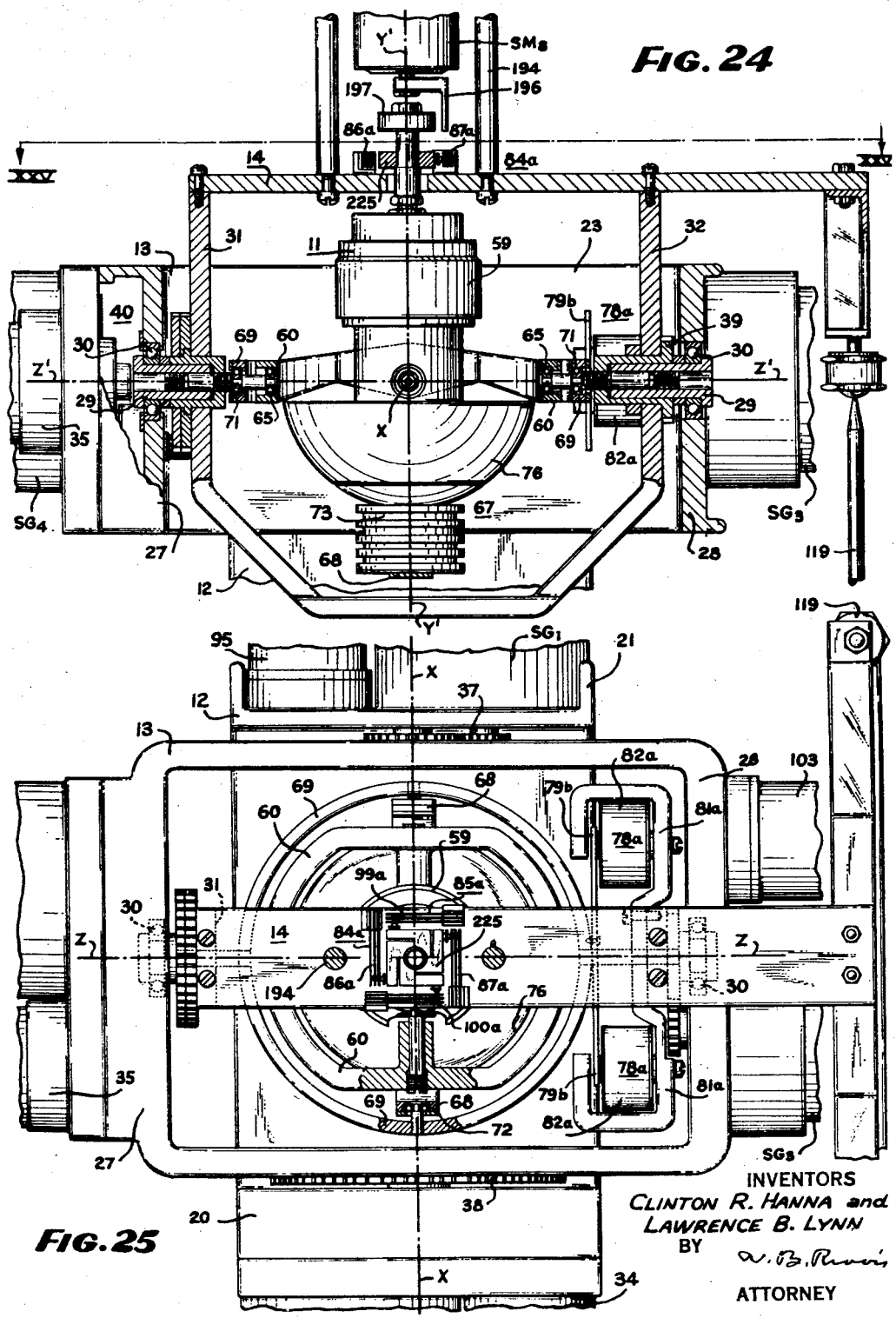
Figure 28:
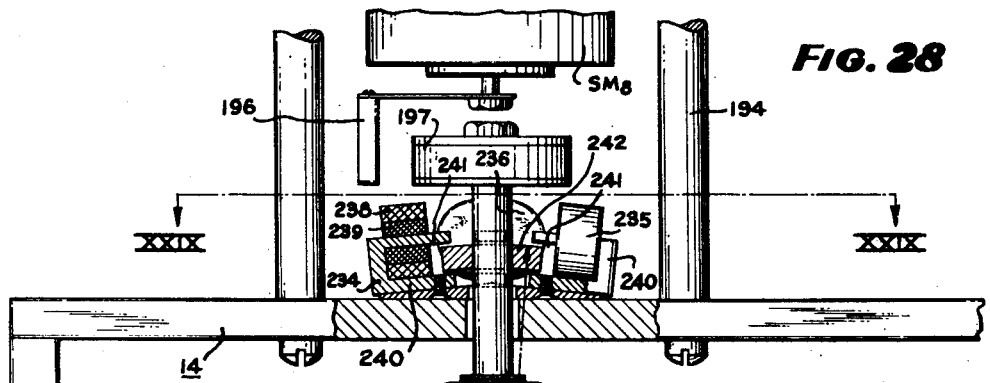
Figure 29:
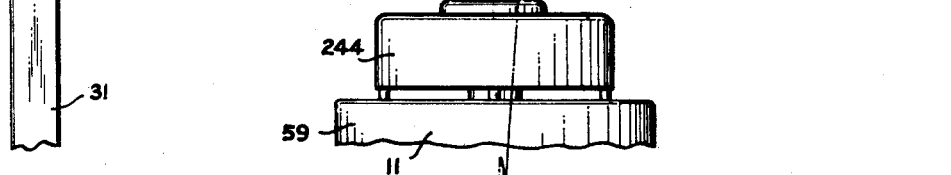
Figure 30:
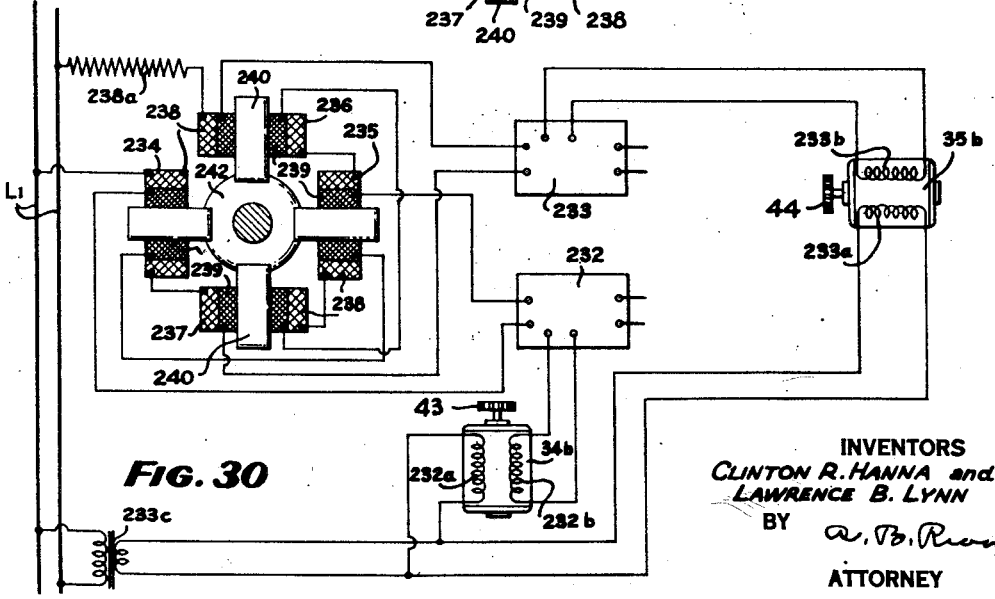

Figs. 15, 16 and 17 are diagrammatic views showing gyro, stable element, and deck tilt corrector relations, Fig. 15 being for a given position of the stable element in train with the ship rolled only about the keel or fore-and-aft axis, Fig. 16 being similar to Fig. 15 but showing the apparatus in relation to the ship for pitching movement only, and Fig. 17 showing the relationship of apparatus of Fig. 16 trained 90 degrees from the position shown in the latter figure;

Figs. 18, 19 and 20 are diagrammatic views illustrating the relationship of the stable element and the deck tilt corrector, these views showing the relationship of the stable element and ship components of the deck tilt corrector for trained positions 45 degrees apart;

Figs. 21A and 21B are wiring diagrams illustrating the control circuits;

Fig. 22 is a diagrammatic view showing compass deck tilt corrector and ship relations;

Fig. 23 is a diagrammatic view showing location of the stable element with respect to the ship;

Fig. 24 is a sectional view similar to Fig. 5 but modified in respect to the manner of supporting the gyro and the arrangement of the controlling devices operated by the latter;

Fig. 25 is a sectional view taken along the line XXV—XXV of Fig. 24;

Fig. 26 is an enlarged detail view of contacts and their actuator;

Fig. 27 is a wiring diagram pertaining to Figs. 24, 25 and 26;

Figs. 28, 29 and 30 show a stable element modified for alternating control of the cross level and level, Figs. 28 and 29 being detail views of magnetic pick-up control devices and Fig. 30 being a wiring diagram;

Figs. 31 and 32 are detail views of the turn gyro and switch controlled thereby; and Fig. 33 is a view taken along the line XXXIII—XXXIII of Fig. 32.

The invention is concerned with a stable element operative to provide desired leveled training movement or positioning irrespective of rolling, pitching or yawing of a ship, the angular movements necessary to maintain the level condition as well as azimuthal or training movement being transmitted to other devices to level and train them similarly. The stable element has three principal axes of freedom: (1) a train axis perpendicular to the ship's deck; (2) a cross level axis parallel to the deck and rotatable in train; and (3) a level axis made horizontal by a gyro and a follow-up system acting about the cross level axis. The level axis also has a follow-up system using the same gyro to cause the level member or ring to become completely leveled.

More particularly, the stable element includes a yoke carried by the ship and which may be turned or trained about its longitudinal axis extending normally of the deck plane, a cross level pivoted to the yoke about an axis parallel to the deck plane, and a level pivotally carried by the cross level, with the cross level pivot axis normal both to the train axis and the level pivot axis. With this arrangement, the level, rotating in train, may be maintained in level condition or positioned by tilting the level and cross level about their pivot axes dependent upon rolling, pitching and listing of the ship.

To keep the level positioned or in level condition with its axis horizontal involves the use of a vertical reference element, preferably provided by a gyro, the gyro controlling servo-motor systems effective to move the cross level and level about their axes to position the level.

The cross level angular movement about its axis or the cross level and level angular movements about their axes and training movements of the yoke are transmitted to any desired device for positioning or stabilization purposes, for example, the angular movement information may be used to stabilize any three-axis system aboard ship, a two-axis system when aimed horizontally, or the roll and pitch axes of a four-axis system.

As leveling or positioning in the stable element involves angular movements about perpendicular transverse axes, errors or variations are introduced on account of roll and pitch. Therefore, there is provided a deck tilt corrector for imparting to the yoke angular movements to compensate for the variations otherwise existing in train movements, with the result that these movements, as transmitted, do not involve variations arising out of the inherent mechanical action of the pivotally-connected members. The deck tilt corrector is particularly desirable where training of the stable element is controlled in relation to the ship's course, in which event the compass output is used by the deck tilt corrector in controlling the train servo-motor system. As both the compass and the deck tilt corrector are mounted with respect to the ship about axes parallel to the roll or keel axis, the compass output, so far as the stable element is concerned, will not be modified because of the compass mounting and roll and pitch. Therefore, the compass output has to be modified only for the purpose of compensating for errors that would otherwise be introduced on account of the level and cross level pivotal mounting and due to roll and pitch.

Remote control may be effected by a device adjustable in azimuth to control training movement. Such a device may serve for sighting and like purposes, in which event the adjusting means would be differentially connected between the output of the compass and the input of the deck tilt corrector. With an indicator operable by the manual adjusting means, true azimuth will be shown for the reason that any adjustment is in relation to the compass. Furthermore, the compass connection in this relation assures of the avoidance of errors on account of yaw.

Aside from having training movement of the stable element under control of the ship's compass, the apparatus is constructed and arranged to be trained manually or continuously for constant velocity scanning at a desired rate.

An understanding of the various electrical features intimately related to the mechanical ones so as to constitute a stable element system operative in the various ways hereinafter indicated will be facilitated by reference to diagrammatic Figs. 21A and 21B. As will be seen from these views, there are three electric supplies, first, a supply line $L_1$ for furnishing three-phase alternating current of suitable voltage and frequency, for example, 110 volts and 240 cycles, second, a single-phase, 110-volt, 60 cycle supply line $L_2$, and, third, a 24-volt direct current supply line $L_3$.

Angular motions are transmitted, combined and modified by a telemetric system including appropriate components. While an electric system of the single-phase synchro-tie type is shown, it is to be understood that any system capable of dealing with angular movements as herein described may be employed. The well-known single-phase synchro-tie connections illustrated and applied as hereinafter described include synchro-generators, synchro-motors, differential generators, and control transformers, indicated by symbols "SG," "SM," "DG" and "CT," respectively.

As illustrated, each synchro-generator, control transformer, and synchro-motor has relatively rotatable elements provided with single-phase and polyphase, for example, three-phase windings; and each differential generator has a pair of relatively movable elements provided with three-wire or three-phase windings. The three-phase windings of the synchro-generators are connected to similar windings of the differential generators, the control transformers and the synchro-motors; and the three-phase windings of each differential generator are connected to like windings of an input source and to an output, the latter being either a control transformer or a synchro-motor.

With the synchro-generator connected to a synchro-motor and with the single-phase windings thereof excited from a suitable single-phase alternating current source, rotation of the synchro-generator produces voltage variations in its three-phase winding and such variations applied to a similar winding of a synchro-motor react with the single-phase winding of the latter to produce rotation synchronously with the synchro-generator.

Each differential generator functions to combine, in a differential manner and electrically, input received from a synchro-generator with motion applied thereto to provide an output, which, when applied to a synchro-motor, causes the latter to rotate dependent upon motion inputs to the synchro-generator and to the differential generator combined differentially.

An electrical input to the three-phase winding of a control transformer may be either from a synchro-generator or a differential generator, and rotation of the transformer produces voltage variations in its output single-phase winding.

As shown, the stable element, at 10, preferably carried by a ship at or near the roll axis (Fig. 22), comprises a gyro, at 11, supported from the yoke, at 12, by means of the cross level or phantom ring, at 13, and the level or phantom, at 14. The yoke is mounted on the ship's structure with its longitudinal or train axis extending perpendicular to the deck surface or plane, the yoke being retained in place for rotation in azimuth or in train by suitable bearings 15 and 16 between its shank 17 and the tubular pedestal 18 having a base 19 arranged to be attached to the ship indicated at 19a.

The yoke has upper parallel arms 20 and 21 for the cross level ring, at 13, the latter preferably being of rectangular formation and having opposed sides 22 and 23 provided with trunnion elements 24 and 25 supported by anti-friction bearings 26 carried by the yoke arms. The other two opposed sides 27 and 28 of the cross level are provided with inwardly-extending trunnions 29 supported by anti-friction bearings 30 fitting internally of the aligned rings 31 and 32 carried at opposite ends of the level ring, at 14. Thus, the cross level and the level have cross-level and level pivot axes $x$—$x$ and $z$—$z$, respectively, defined by the supporting bearings 26 and 30, and the yoke has a training axis $y$—$y$, defined by the axis of the bearings 15 and 16, the cross-level axis $x$—$x$ being normal both to the level axis $z$—$z$ and to the yoke axis $y$—$y$ and being parallel to the deck with the axis $y$—$y$ normal to the latter.

Referring to Fig. 21a, the sensitive element includes a neutral gyro, at 11, having its spin axis constrained to vertical position by erecting means hereinafter described and it cooperates with control or pilot devices carried by the level or by both the latter and the cross level to control servo-motor systems including the reversible motors 34 and 35 mounted, respectively, on the yoke, at 12, and the cross level, at 13, and operative to tilt the cross level and the level, at 14, about the cross level and level axes, to maintain the level in level condition with a predetermined level axis plane normal to the spin axis regardless of training movement by the yoke or varying inclination of the training axis on account of roll and pitch. Desired training movement may be secured by control, as hereinafter described, of a reversible azimuth training motor 36 mounted on the base 19 of the yoke sup, ort and operatively connected to the yoke so as to move the latter about its training axis.

The stable element, at 10, functions as a master device for controlling any suitable device or devices. An example of such a controlled device is shown, at 10a, in Figs. 21B, it including a yoke, at 12a, a cross level, at 13a, and a level, at 14a, operatively connected to corresponding components of the stable element for like cross-level, level and train movements. Since the stable element is a gyro-controlled instrument used on board ship to measure and transmit level and cross level angular values with respect to the line of sight to the target, four planes are used in measuring the required angles, the planes being: the plane perpendicular to the deck, the vertical plane, the deck plane, and the horizontal plane. The stable element may be installed with its gimbal, or cross level and level, axes oriented with respect to the line of sight in positions 90 degrees apart. The line of sight may be in a plane of rotation of the level axis and extending in the direction of the cross level axis, or it may be in a plane of rotation of the cross level axis and extending in the direction of the level axis. With the line of sight in the plane of rotation of the level axis, it is necessary to provide level axis and cross level axis synchro-generators, as shown, the level axis synchro-generator transmitting the angle between the horizontal and deck planes intersecting at the level axis and which angle is measured in a vertical plane containing the line of sight to the target, and the cross level axis synchro-generator transmitting the angle between a plane perpendicular to the deck and a vertical plane which intersect at the cross level axis, the angle being measured in a plane perpendicular to the deck and at right angles to the plane containing the line of sight. On the other hand, with the line of sight in a plane of rotation of the cross level axis, since the latter axis is necessarily in a plane parallel to the deck plane and the level axis is held horizontal by the gyro-vertical, it is only necessary to provide synchro-generator means associated with the cross level axis and which serves to transmit the angle between the horizontal and deck planes and measured in a plane perpendicular to the deck through the cross level axis and containing the line of sight to the target.

In order that the stable element, at 10, may keep a level member of a controlled device in level condition and moving in train with its level, at 14, it is necessary to provide for the transmission of angular movements of the stable element yoke, cross level, and level to the corresponding members of the controlled device synchronously and to like extents. To this end, referring to Figs. 21A and 21B, the cross levels of the stable element and of each control device are joined by single-phase, synchro-tie connections including cross-level synchro-generators SG1 and SG2 mounted on the yoke, at 12, and operated by the cross level, at 13, and cross-level synchro-motors SM1 and SM2 (Fig. 21B) mounted on the yoke, at 12a, of each controlled device for moving the cross level, at 13a, thereof. Synchro-tie connections, including level synchro-generators SG3 and SG4 and the level synchro-motors SM3 and SM4, are mounted on the cross levels and are operatively connected to the levels. In like manner, the yokes are joined by synchro-tie connections comprising yoke or train synchro-generators SG5 and SG6 mounted on the base and operatively connected to the yoke or train synchro-motors SM5 and SM6 similarly arranged with respect to the yoke of each controlled device.

As is well known in the art, for example, see U. S. Patent Number 1,626,824 and fire control and gun-directing art, increased accuracy is secured in transmitting angular motion from a controlling member to a controlled member by the provision of synchro-tie connections of different speeds provided by gearing of desired ratios. For example, gear trains, at 37, 38, 37a, and 38a, connect the synchro-generators SG1 and SG2 and the synchro-motors SM1 and SM2 to the cross levels, the gearing being so chosen that the angular motion transmitted by the synchro-tie connection, including the synchro-generator SG1 and the synchro-motor SM1, will be twice that of the controlling member and the angular motion transmitted by the synchro-tie connection, including the synchro-generator SG2 and the synchro-motor SM2, will be, for example, 36 or 72 times that of the controlling member. Therefore, such synchro-generators and synchro-motors are referred to as "2-speed" and "36-speed" devices. In like manner, the level synchro-generators SG3 and SG4 and the level synchro-motors SM3 and SM4 are connected by gear trains, at 39, 40, 39a, and 40a, to the levels for 2-speed and 36-speed operation. One-to-one gearing, at 41 and 41a, and 36-to-one gearing, at 42 and 42a, provide for one-speed operation of the train synchro-generator SG5 and the train synchro-motor SM5 and for 36-speed operation of the train synchro-generator SG6 and the train synchro-motor SM6. The gear trains, at 38, 40 and 42 are utilized for transmitting motion from the cross-level and level motors 34 and 35 and the azimuth motor 36 to the cross level, the level, and the yoke, the motors having pinions 43, 44 and 45 meshing with gears of the train so as to secure a desired speed reduction.

As said synchro-tie connections are similar, a brief description of one will suffice for all. Referring to the cross-level synchro-generator SG1 (Fig. 21A) and the associated cross-level synchro-motor SM1 (Fig. 21B), each of these devices includes relatively movable members provided with single-phase and three-phase windings. The single-phase exciting windings 47a and 48a of the synchro-generator and the synchro-motor are connected to the source La and the three-phase windings 47b and 48b thereof are joined by a three-wire connection 50. In like manner, the three-wire connections 51, 52, 53, 54 and 55 join the three-phase windings of the synchro-generators SG2, SG3, SG4, SG5, and SG6 to the synchro-motors SM2, SM3, SM4, SM5, and SM6, respectively.

Where required, the various electrical connections include slip rings 56 and 56a on the yokes at 12, and at 12a.

The gyro, at 11, is of the neutral or non-pendulous type, it comprising a rotor 58 driven by a motor supplied from the line L1 and carried by a frame or casing 59. The spin axis $y'$—$y'$ of the gyro is maintained normally vertical by the means hereinafter described and it has an inner tilt or gimbal axis $z'$—$z'$ and an outer tilt or gimbal axis $x$—$x$, with the inner tilt axis arranged at right angles to the spin axis and to the outer tilt axis, the tilt axes and their arrangement being provided by a gimbal ring 60 pivotally connected to the casing or frame 59 and to the stable element construction consisting of the pivotally-connected yoke, cross level and level members. The gyro is suspended so that the tilt axes and the spin axis intersect at the training axis, and preferably the gyro is so arranged in relation to the stable element that the intersection of its spin and tilt axes is coincident with that of the cross level and level axes, that is, the center of the gyro is at the intersection of the cross-level, level and train axes.

As shown, the inner or gyro gimbal ring 60 has inwardly-extending sleeves 61 with pins 62 supported therein by spaced anti-friction bearings 63, 63, and whose inner ends support the inner frame 59 by means of anti-friction bearings 64. Also, the gimbal ring is pivotally supported with respect to the cross level axis by anti-friction bearings 65 from the inner ends of pins 66 carried by the cross-level trunnions 24 and 25 supported from the yoke by the cross-level bearings 26.

The sensitive element also includes a pendulous erector, at 67, cooperating with the lowermost portion of the gyro to cause the spin axis to seek the vertical. With the gyro supported from the cross-level, as shown in Figs. 1 to 11, inclusive, and having its gimbal axis $x_1$—$x_1$ coincident with the cross-level axis, the erector is comprised by a ball 68 supported with respect to the cross level pivot axis $x$—$x$ by means of the outer gimbal ring 69, the latter having pivotal supporting anti-friction bearings 71, 71 (Figs. 5 and 7) for the ball and being supported by anti-friction bearings 72, 72 (Figs. 6 and 7) located at right angles to the bearings 71, 71 and carried by the pivot pins 68, 68 defining the $x$—$x$ axis. An erecting magnet 73 (Figs. 2, 5, 6 and 21A) is pendulously supported by the ball, the arrangement being such that the vertical passing through the common point of intersection of the gimbal ring axes is coaxial with the magnet and it has a winding 74 included in a circuit 75 (Fig. 21A) supplied from the line $L_0$. As the gyro and the erecting magnet are supported by gimbals which are carried by the same pins, the erecting magnet moves about the same center as the gyro and this center is coincident with the intersection of the stable element cross-level, level, and train axes. In other words, the outer and inner pendulous pivot axes are at right angles and are in the normal planes which intersect at the train axis and contain the cross-level, level and gyro tilt axes.

The gyro rotor carries at its lower end a spherical metallic member 76, preferably made of copper and constituting the flywheel, and the magnet preferably has the upper end of its core 77 spaced from the member 76 by a suitable air gap providing a loose coupling. The induction of eddy currents in the member 76 biases the gyro to the position with the spin axis $y'$—$y'$ coaxial with the magnet, and, therefore, to the vertical, for the reason that departure from that position is opposed by increasing resisting moments as the induction of eddy currents occurs with more eccentricity with respect to the spin axis. The tangential force or drag gives rise to a moment about a horizontal axis which precesses the gyro in a direction to make its spin axis coincide with the center of the erecting magnet.

Oscillations of the eddy current erector, due, for example, to the tendency of the magnet to follow the flywheel and thereby cause the erector gimbal system to oscillate, are damped in any suitable manner. For example, there is shown a magnetic damper, at 78 (Figs. 3, 4, 7 and 21A) comprised by an arm 79 attached to the outer gimbal ring 69 and whose outer end preferably comprises a copper plate 79a movable in the gap 80 of the core 81 of the electro-magnet carried by the cross level and whose winding 82 is supplied from the D. C. line $L_0$ by the connection 83 (Fig. 21A). Eddy current damping of oscillations makes possible the use of a magnet exerting strong erecting force.

With its spin axis $y'$—$y'$ maintained vertical, the gyro controls movement of the cross level, at 13, and the level, at 14, about their cross-level and level axes $x$—$x$ and $z$—$z$, respectively, to position the level, that is, to maintain the latter with a predetermined plane including the level axis normal to the gyro spin axis $y'$—$y'$.

To effect operation of the motors 34 and 35 to tilt the cross level and the level with respect to the cross-level and level axes, as required to position the level irrespective of rolling, pitching, or listing of the ship, there are provided energy-controlling pick-up or pilot devices, at 84 and 85 (Figs. 2, 5, 6 and 21A), for the follow-up servo-motor systems including the motors 34 and 35.

If, due to tilting of the ship, the cross level moves in relation to the gyro with respect to the cross-level axis $x$—$x$, then the energy-controlling pick-up device, at 84, is rendered effective to cause the motor 34 to drive the cross level until the level axis $z$—$z$ is disposed normal to the spin axis $y'$—$y'$, that is, as is shown, is brought into coincidence with the gyro axis $z'$—$z'$; and, if angular movement of the level, at 14, occurs with respect to its level axis $z$—$z$ and relative to the gyro, then the controlling or pick-up device, at 85, causes the motor 35 to drive the level member into position such that a predetermined level axis plane is normal to the spin axis $y'$—$y'$. In general, the follow-up systems are controlled by the gyro so that, with the spin axis vertical the level is maintained in level condition with a predetermined plane thereof containing its pivot axis normal to the spin axis.

In Figs. 1 to 11, inclusive, the pick-ups, at 84 and 85, are each constituted by a pair of groups of contacts and an actuator, with the groups of contacts of each pair arranged to control the direction and strength of current for the field of the generator of a motor-generator set, the outputs of the generators being furnished to the motors for the cross level and the level, each motor and the motor-generator set supplying it constituting a follow-up arrangement for the reason that operation of the motor results in relative movement of the contacts and the actuator opposite to that responsible for motor operation.

As shown, the pick-up, at 84, includes spaced contact groups 86 and 87, each group being comprised by self-opening spring contacts 88 tapped along resistors 89 and 90 arranged in circuits 91 and 92 (Fig. 21A) for the reversing field 93 of the generator 94 of the motor-generator set, at 95, carried by the yoke arm 21 and including the driving motor 96. The circuits 91 and 92 are supplied from the direct current line $L_0$ and the motor 96 receives power from the line $L_1$. The output of the generator 94 is supplied to the cross-level motor 34.

Figure 6:
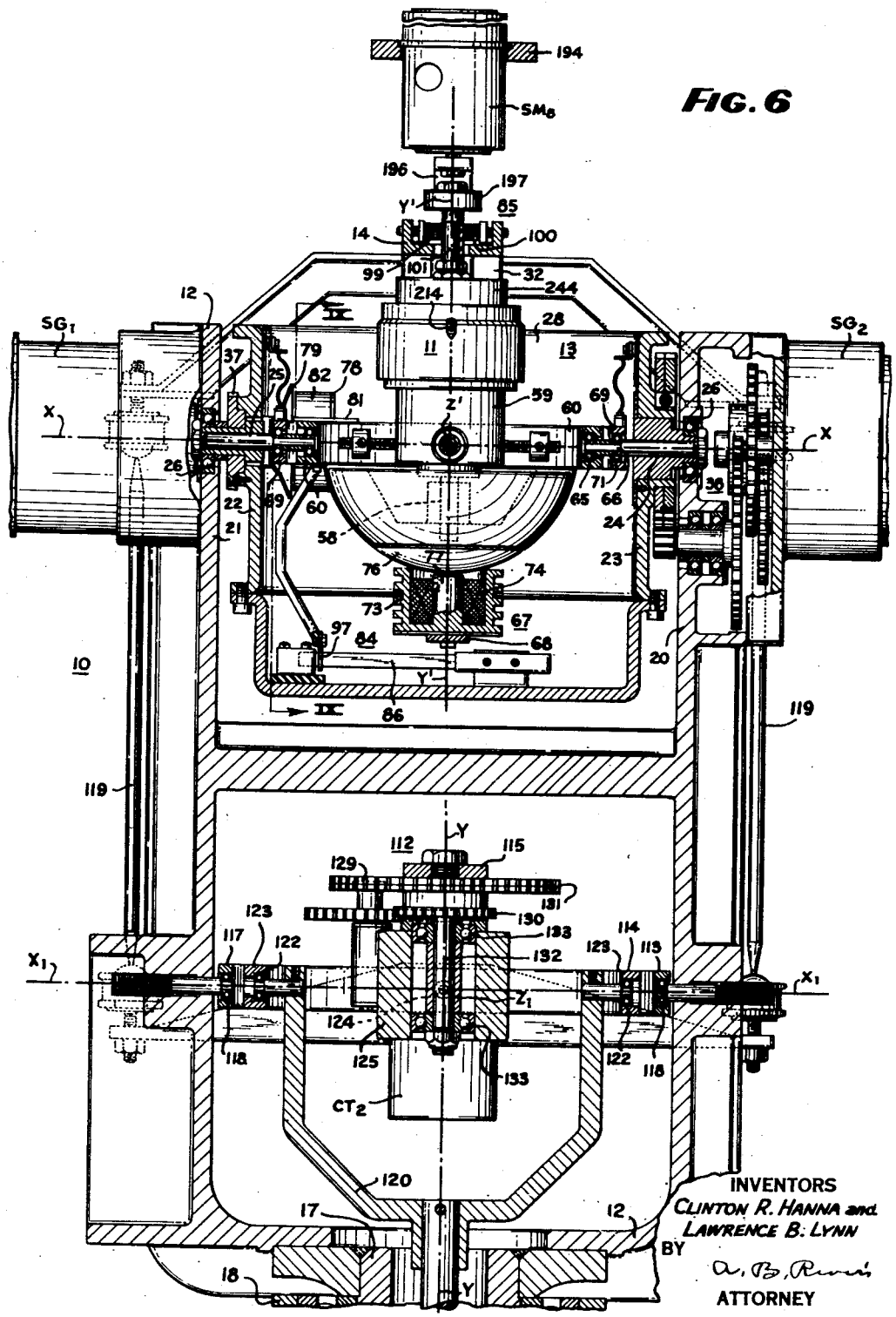
Fig. 6 is a vertical sectional view taken along the line VI—VI of Fig. 1.
Figure 7:
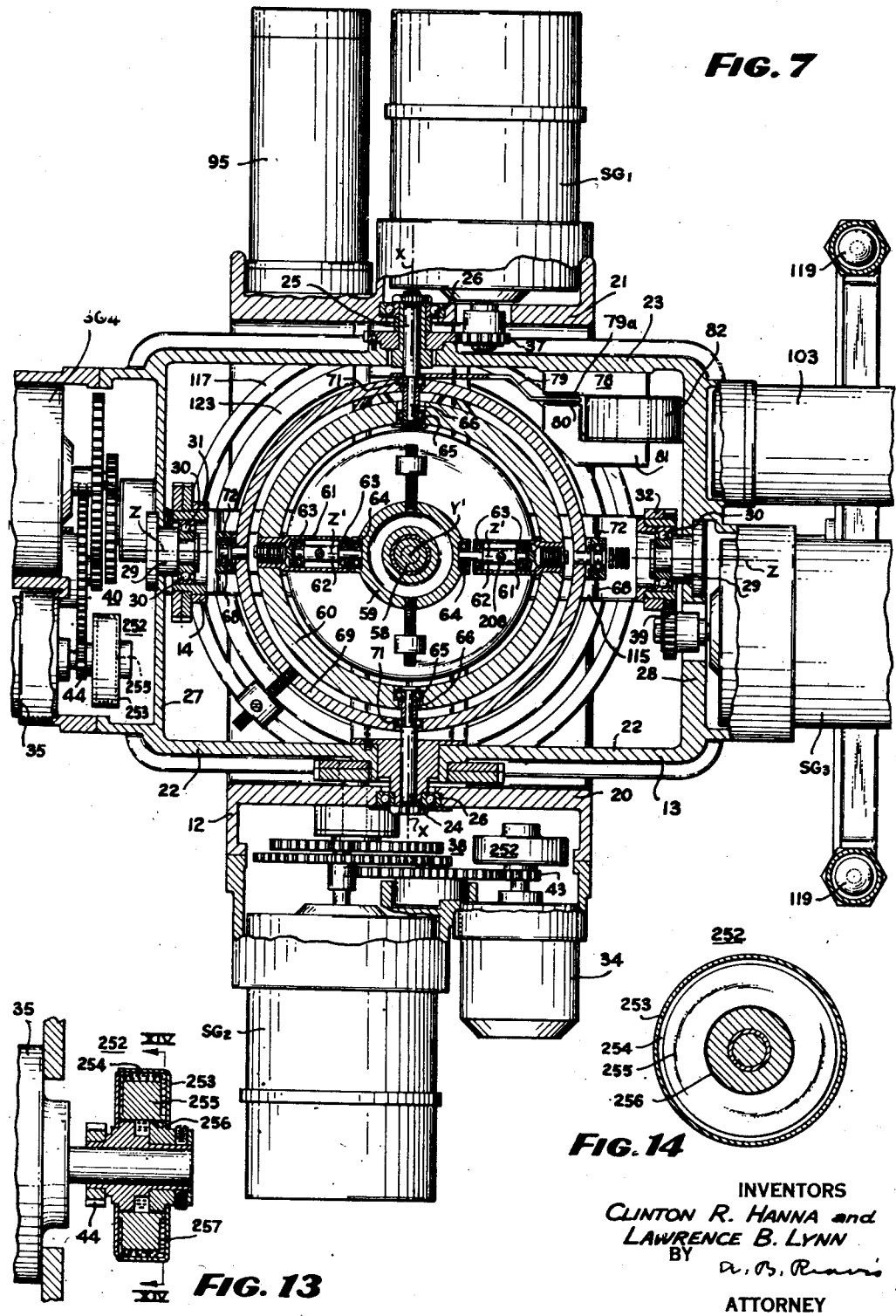
Figs. 7 and 8 are horizontal sectional views taken along the lines VII—VII and VIII—VIII of Figs. 1 and 5.
Figure 8:
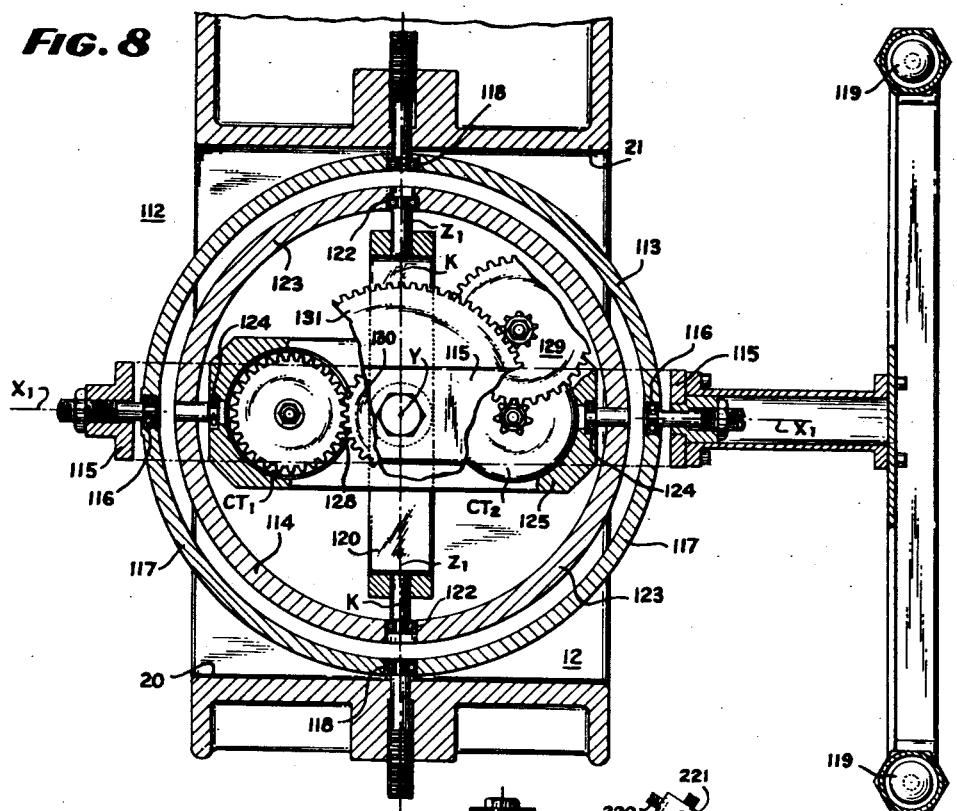
Figure 9:
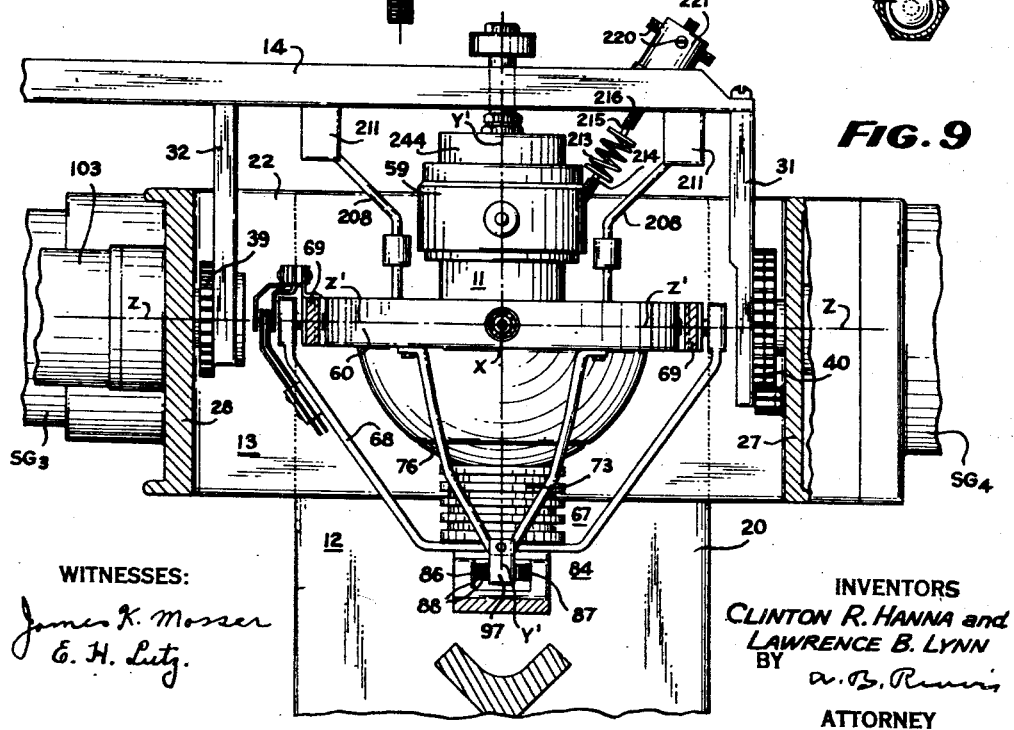
Fig. 9 is a vertical sectional view taken along the line IX—IX of Fig. 6.
Figure 10:
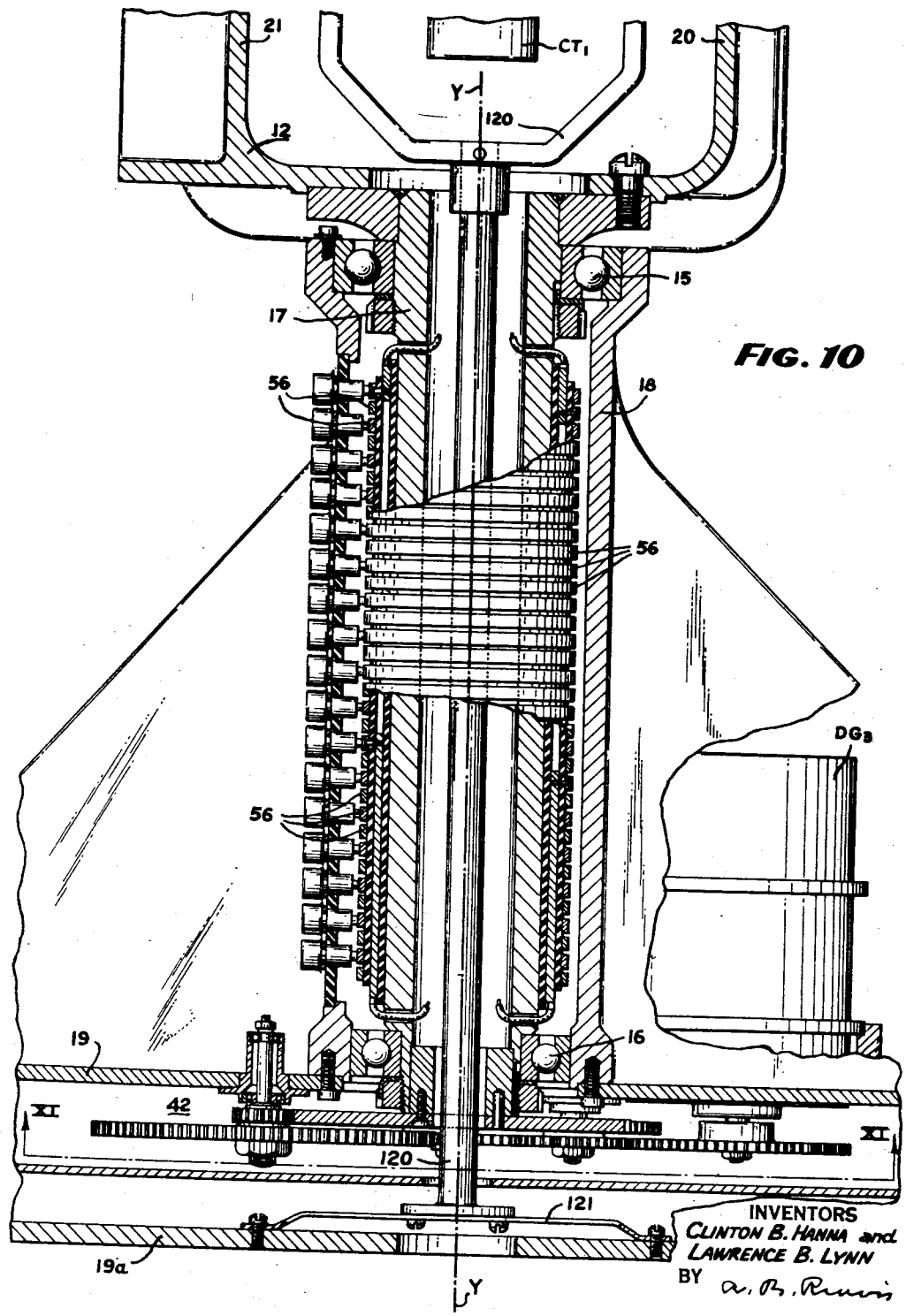
Fig. 10 is a vertical sectional view taken along the line X—X of Fig. 2.
Figure 11:
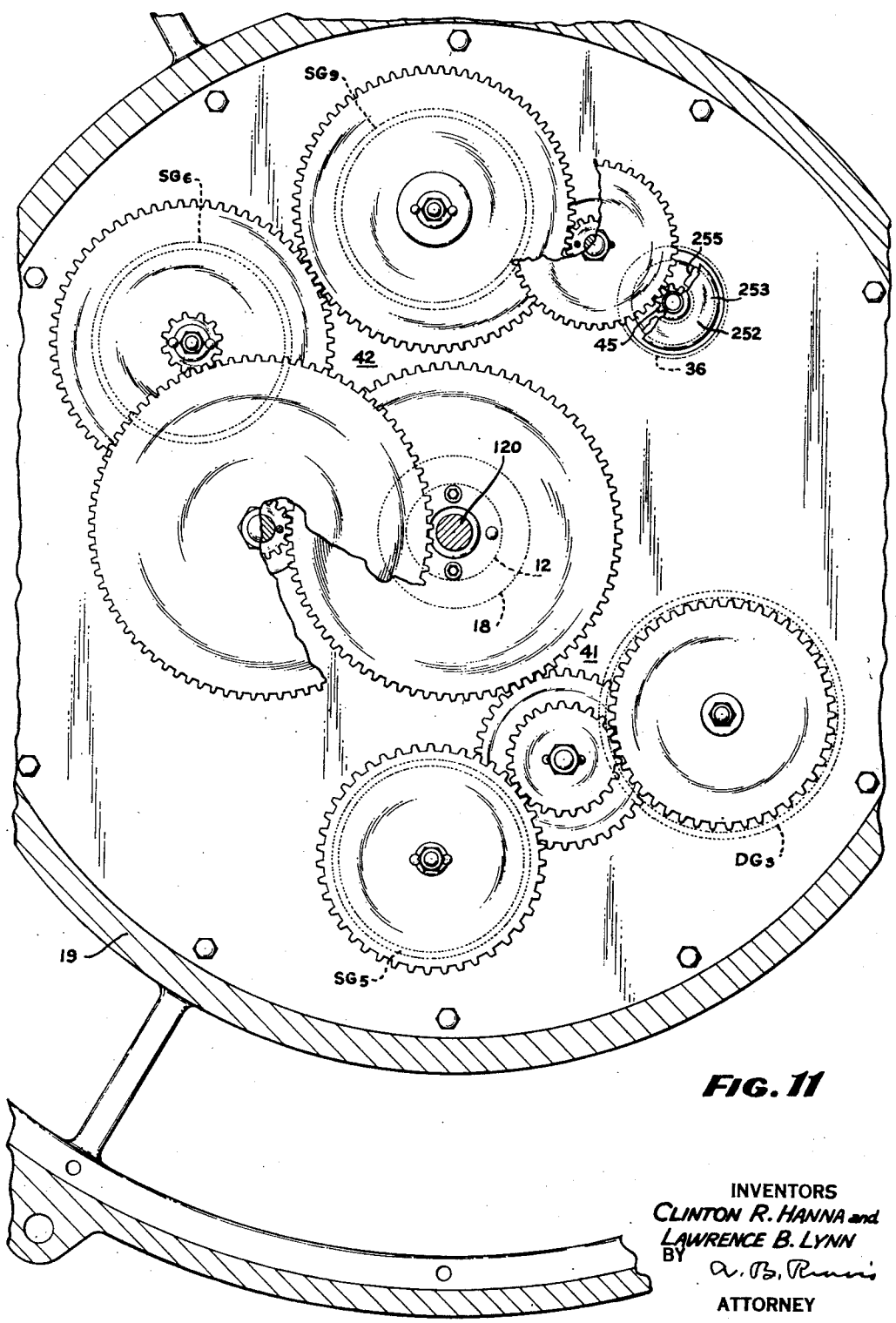
Fig. 11 is a section along the line XI—XI of Fig. 10 and viewed in the direction of the arrows.

A contact actuator 97 is attached to the gyro gimbal ring 69 so as to depend below the latter and be operative to engage contacts in response to angular movement with respect to the cross-level axis $x$—$x$ (Figs. 6 and 9). With the actuator in mean position, the currents of the circuits 91 and 92 oppose each other such that there is no differential effective to energize the split field 93; however, if relative movement of the actuator and the groups of contacts occurs in one direction or the other, the contacts are actuated to vary the currents in the circuits differentially in opposite directions so as to secure corresponding generator output furnished to the motor, the consequent follow-up operation of the motor resulting in relative movement of the groups of contacts and the actuator until the latter is restored to its mean position.

In like manner, the pick-up, at 85, is comprised by a pair of spaced groups of contacts 99 and 100, extending at right angles to the groups of contacts 86 and 87, operated by the actuator 101 carried by the upper portion of the gyro and arranged coaxially with respect to the spin axis. As before, the contacts are actuated to vary differentially in opposite directions energizing currents supplied to the field of the generator 102 of the motor-generator set, at 103, carried by the side 28 of the cross level and including a motor 104 connected to the line $L_1$, and the generator being arranged to supply current to the level motor 35 to move the level with respect to its pivot axis $z$—$z$, operation of the motor in consequence of contact actuation resulting in movement of the level until the actuator is restored to mean or mid position with respect to the contacts.

Positioning of the level member, at 14, by means of the follow-up servo-motor systems controlled by the vertical reference involves angular movements of the cross level and of the level about the cross-level and level axes and makes it necessary to introduce deck tilt corrections to avoid deviations or errors in the transmitted train angles on account of roll and pitch, this being particularly desirable, as hereinafter pointed out, where control is in relation to the ship's course. Accordingly, there is provided a deck tilt corrector, at 112, including an outer gimbal system or stable element component, at 113, and an inner gimbal system or ship component, at 114.

The stable element component, at 113, includes a cross member 115 pivotally connected, at 116, 116, to the gimbal ring 117, which is pivotally connected, at 118, 118, to the yoke about an outer axis at right angles to the inner axis of the pivotal connections 116, 116. The cross member 115 is connected to the level member, at 14, by the links 119, 119; and, as the axes $x_1$–$x_1$ and $z_1$–$z_1$ of the pivots 116, 116 and 118, 118 (Figs. 5, 6 and 19) are parallel to the level and cross level axes $x$—$x$ and $z$—$z$, respectively, it will be apparent that the cross member 115 will be maintained at all times parallel to the level member or phantom, at 14, that is, the axes, of the outer gimbal system are kept parallel to those of the phantom.

The ship's component, at 114, is comprised by a yoke, at 120, secured at its lower end to the ship's structure, preferably by a spring device 121 (Fig. 10) permitting of relative displacement axially of the yoke due to expansion and contraction, and having its upper end pivotally connected, at 122, 122, to the gimbal ring 123, which is pivotally connected, at 124, 124, to the cross member or bar 125. The yoke 120 is so arranged that the axes of the inner gimbal system or ship's component are parallel to the compass axes, that is, the axis of the pivotal connections 122, 122 is parallel to the keel or fore-and-aft axis $k$—$k$ of the ship (Fig. 22).

With the members or bars 115 and 125 pivotally connected, as hereinafter described, and as the bar 115 has its outer axis parallel to the cross-level axis and has its inner axis maintained parallel to the level axis by means of the links 119, 119, the plane of relative angular movement of the bars or members is kept normal to the gyro spin axis; and, as the gyro spin axis is maintained vertical, such plane is kept in the horizontal. Furthermore, the inner and outer axes of the gimbal systems intersect at a common point on the training axis and the axes of the outer gimbal system fall in the aforesaid planes which intersect normally at the training axis and contain the cross level and level axes.

Diagrammatic Figs. 15 to 20, inclusive, show the relationship of the stable element and the deck tilt corrector, and Figs. 15, 16 and 17 further show the relationship of the gyro with respect thereto. Fig. 15 shows, for a given position in train, the relations with respect to the ship rolled about the keel axis. Fig. 16 is similar to Fig. 15 but shows the relations for pitch, and Fig. 17 differs over Fig. 16 in that the apparatus is trained 90 degrees from the latter. Figs. 18, 19 and 20 illustrates stable element and deck tilt corrector relations and show relative angular movements of the cross members of the yoke and ship components for three positions in train 45 degrees apart.

One-speed and 36-speed control transformers $CT_1$ and $CT_2$ include members having windings which are moved relatively due to angular variations or movements of the cross members 115 and 125 with respect to their common normal axis and caused by roll and pitch. As shown, one of the relatively movable members of each transformer is carried by the cross bar 125 and the other members thereof are connected by gearing, at 128 and 129, to the gears 130 and 131 attached to the cross bar 115. A stem 132 secured to the bar 115, in coaxial relation with the gears 130 and 131, and the spaced anti-friction bearings 133 maintain the cross bars or members in parallel relation while permitting of relative angular movement thereof about a normal axis.

The outputs from the deck tilt corrector control transformers $CT_1$ and $CT_2$ are used to control the azimuth motor 36 to move the yoke, at 12, in train or azimuth sufficiently to compensate for errors or deviations because of roll and pitch. As shown (Fig. 21A), the relatively movable members of the control transformers $CT_1$ and $CT_2$ are provided, respectively, with single-phase windings 135a and 136a and with three-phase windings 135b and 136b. The single-phase output windings 135a and 136a are joined by the two-wire connections 137 and 138 to the contacts 139; and, with the double-throw switch 140 (Figs. 21B) engaging the contacts, the output from such windings is supplied as input for the train servo-motor means including the amplifier 141 provided with output connections 142 for energizing the field 143 of the D. C. generator 144 of the motor-generator set, at 145, whose motor 146 is operated by power received from the supply $L_1$. The generator armature output is furnished by the connection 147 to the armature of the direct-current azimuth or training motor 36 (Fig. 21A), whose field 148 has a supply connection 149 providing excitation from the direct current supply $L_3$.

With the deck tilt corrector control transformers $CT_1$ and $CT_2$ having their input windings connected to the output windings of the compass synchro-generators $SG_7$ and $SG_8$, as long as the ship's course is not altered and roll and pitch does not occur, the input and output windings of the control transformers normally have an "in-phase" relation such that no voltage is generated in their output windings; however, roll and pitch bring about mechanically, through the deck tilt corrector mechanism, an "out-of-phase" relation of the control transformer windings, causing the generation of voltage in the output windings and operation of the train servo-motor mechanism to move the yoke in train to the extent required to restore the "in-phase" relation. Thus, roll and pitch produce an 'out-of-phase" relation resulting in follow-up operation of the azimuth motor to train the yoke to restore the 'in-phase" relation.

If there is a change in course, an "out-of-phase" relation of the deck tilt corrector control transformers $CT_1$ and $CT_2$ is effected by the compass synchro-generators $SG_7$ and $SG_8$ and the train servo-motor system is rendered effective in consequence to train the yoke until the latter restores the "in-phase" relation. Therefore, the stable element is kept in agreement with the compass irrespective of the course of the ship.

With a sighting device including differential generators $DG_1$ and $DG_2$ arranged between the compass synchro-generators $SG_7$ and $SG_8$ and the deck tilt corrector control transformers $CT_1$ and $CT_2$ and with manual adjustment of the differential generators, an "out-of-phase" relation of the control transformers is produced to the extent of the adjustment. As the stable element is kept in agreement with the compass by the synchronous connection, including the synchro-generators SG7 and SG8 and the control transformers, irrespective of the course, it will be apparent that, by adjusting the differential generators, an adjustment in train is made in relation to the compass, and as the deck tilt correction operates through the same control transformers, and with the relations of the deck tilt corrector and the compass to axes of the ship and of the deck tilt corrector to the stable element axes, as elsewhere herein described, it will be apparent that a line of sight with respect to azimuth may be held irrespective of change in course or roll and pitch.

Control of training movement of the stable element, at 10, may be effected in several ways. The stable element may be connected to the ship's compass for operation in relation to "own ship's course," as just described, it may be trained manually as desired, or it may be connected for continuous scanning movement at a suitable velocity. Furthermore, training of the stable element may be controlled from a remote point.

In Fig. 21B, a main control panel, at 150, is indicated by the dot-and-dash rectangle and such panel carries said switch 140 and the double-throw switch 151. With the switch 140 engaging the contacts 139 and the switch 151 open, it will be noted that the ship's compass is thereby connected into the controlling system. To this end, there is shown a conventional compass, at 152, preferably of the gyro type, supported from the ship by the usual gimbal mounting, the latter including a gimbal ring 153 pivoted, at 154, 154, with reference to the ship about a fore-and-aft axis k—k, parallel to the keel axis, as is the usual practice, and pivoted, with respect to the compass, at 155, 155, about an axis normal to the first axis, or athwartship.

The compass includes the customary phantom structure 156, driven into positional agreement with the sensitive element by the usual follow-up motor (not shown) responsive to the latter. The phantom structure is geared to one-speed and 36-speed synchro-generators SG7 and SG8 whose relatively movable members are provided with single-phase windings 157a and 158a and three-phase windings 157b and 158b. The single-phase windings 157a and 158a are excited from the supply source La and the three-phase output windings 157b and 158b are respectively joined by the three-wire connections 159 and 160 to the three-phase input windings 135b and 136b of the deck tilt corrector control transformers CT1 and CT2. Thus, compass output, modified by the deck tilt corrector to compensate for roll and pitch, is furnished to the train servo-motor system including the amplifier 141, the generator 144, and the training motor 30.

Also, the compass provides for correction for yaw uninfluenced by roll and pitch for the reason that the axes of the ship pivot bearings 154, 154 and 122, 122 for both the compass and the deck tilt corrector are parallel to the keel or fore-and-aft axis. If desired, with the system connected for "own ship's course" operation, any suitable device, at 104, may be sighted at an object or target by moving a crank 165 which operates the differential generators DG1 and DG2 interposed in the three-wire connections 159 and 160 between the compass synchro-generators SG7 and SG8 and the deck tilt corrector control transformers CT1 and CT2. With the sighting device connected between the compass and the deck tilt corrector, it is assured that an operated device, at 10a, will be held sighted in relation to azimuth without deviation on account of yaw, roll and pitch because the deck tilt corrector makes possible direction in azimuth with respect to the vertical rather than to an axis perpendicular to the deck of the ship.

The one-speed differential generator DG1 has windings 166a and 166b joined by the three-wire connection 159 to the compass synchro-generator winding 157b and to the deck tilt corrector transformer winding 135b. In like manner, the 36-speed synchro-generator and control transformer windings 158b and 136b are joined by the three-wire connection 160 to the windings 167a and 167b of the differential generator DG2.

When the crank 165 (Fig. 21B) is turned, the differential generators DG1 and DG2 are operated to effect "out-of-phase" relation of the control transformers CT1 and CT2 and the yoke is moved in train in consequence, such training movement continuing until the "in-phase" relation of the control transformers is restored whereupon training movement ceases. As the effect of the sighting device is superposed on that of the compass, it will be apparent that the indicators 168 and 169 will show the true azimuth.

For local control, either manual or continuous scanning, the switch 140 is disengaged from the contacts 139 and engaged with the contacts 171, 172 and 173 and the switch 151 is engaged either with the contact 174 or with the contacts 175 and 176.

To provide for manual control, a control transformer CT3 is mounted on the panel 150 and it has a pair of members which are moved relatively by a handle or crank 178 in front of the dial 179. One of the relatively movable members has a single-phase output winding 180a joined by the connection 181 to contacts 171 and 174 and the other of said members has a three-phase input winding 180b joined by the three-wire connection 182 to the three-wire output winding 183b of the 36-speed train synchro-generator SK9 carried by the base and operatively connected to the yoke (Fig. 21a), the synchro-generator having an exciter winding 183a supplied from the source La. With the switch 151 positioned to engage the contact 174 and the switch 140 positioned to engage the contacts 171, 172, and 173, if the crank 178 is moved, the "out-of-phase" relation thus created results in the generation of voltage in the winding 180a and which is impressed, by the connections including the contacts 171 and 172, on the amplifier 141 to effect operation of the azimuth motor 30 to move the yoke in train; however, as the train synchro-generator SG9 is operated by the yoke and the three-phase windings thereof and of the control transformer CT3 are connected, it will be apparent that the yoke will follow the dial or handle 179, it coming to a stop when the "in-phase" relation of the control transformer windings is restored by the synchro-generator.

In addition to the dial 179, a dial 184 is mounted on the panel 150 and operated by means of a one-speed synchro-tie connection with the yoke, such connection including the train synchro-generator SG5 joined by the connection 54 to the synchro-motor SM7 operating the dial 184. The dial 184 may, therefore, be calibrated in degrees and the dial 179 in minutes.

For continuous scanning, the switch 151 is positioned to connect the single-phase supply line La through a potentiometer, at 186, the contacts 175 and 176, and the contacts 172 and 173, to the input of the amplifier 141, the potentiometer being adjustable to secure scanning at any desired velocity.

Any suitable means may be used to interrupt the exciting circuit for the erecting magnet in response to turning of the ship. For example, the angular velocity switch disclosed and claimed in the application of Wilson et al., Serial No. 551,572, filed August 28, 1944, may be used; or, as shown on the accompanying drawings, this purpose may be achieved by a gyro, at 187, (Fig. 21B) cooperates with contacts 188 and 189, 189 to constitute an angular velocity switch which closes, when the turning velocity of the ship has sufficient magnitude and duration, to open the circuit 75 for supplying direct current from the supply line L₀ to the erecting magnet 73. For example, the arrangement may be such that the switch is not closed until the angular velocity of ship turning reaches a value of one turn in eighteen minutes and has a duration of not less than 7 degrees of turn, the purpose of requiring such a duration being to avoid interruption of the erecting magnet energizing circuit on account of yawing of the ship.

As shown in Figs. 31 and 32, the turn gyro, at 187, includes a rotor aggregate comprising a spinning body 190 and a casing 190a pivoted, at 190b, to the yoke 190c, swiveled by bearing 190d to the pedestal 190e rigidly mounted with respect to the ship's structure. The rotor is disposed so that the spin axis is transverse to an axis about which the ship turns, that is, the swivel axis is in substantially parallel relation to the turning axis of the ship and the inner tilt axis provided by the pivots 190b is normal both to the outer tilt or swivel axis and to the spin axis. Turning velocity of the ship applied through the outer tilt axis combines with spin velocity of the rotor to produce precession about the inner tilt axis. Precession is opposed by centering springs 190f connecting the gyro casing to the yoke.

Turning motion from the ship is transmitted to the gyro by means of a coupling comprised by the friction shoes 190g carried by the pedestal 190e and cooperating with the plate 190h depending from the gyro casing and in the plane of the spin axis and of the outer tilt or swivel axis. Thus, the coupling transmits turning motion to the gyro, accommodates for precession, and provides for damping of precessional oscillations.

Damping allows for relatively soft or light centering springs 190f permitting of large precessional motion. As more fully pointed out in Patents 2,381,160, of August 7, 1945, and 2,385,203, of September 18, 1945, precessional velocity combines with spin velocity to give a gyroscopic reaction or torque opposing the applied torque with the result that the plate will engage a shoe with a normal force arising from gyroscopic action and which is proportional to precessional velocity. With the friction thus made proportional to precessional velocity, it is effective about the precessional axis to provide a torque proportional to precessional velocity and opposing precession so as to damp precessional oscillations to the best advantage. The depending plate 190h has sufficient lateral resilience to maintain continuous contact with the shoes for damping in the presence of vibration, the plate being relatively wide and of a thickness to provide the requisite resilience.

The shoes 190g are mounted on the inner ends of the screws 190i which are adjustably carried by the pedestal 190e. Adjustment of the centering springs is secured by the screws 190k adjustable with respect to the yoke structure 190c. The provision of relatively light or soft centering springs and these features of adjustment, taken in conjunction with maintenance of damping contact of the shoes and the plate and the spacing of the contact 188 with respect to the contacts 189, makes possible a large angle of precessional motion and utilization of the latter to effect closing of contacts and interruption of the energizing circuit for the erecting magnet when the turning velocity of the ship has sufficient magnitude and duration.

Without damping, the turn gyro, at 187, would have precessional oscillations induced by vibratory conditions of the surroundings and the contacts could not be kept in engagement on that account. Damping is, therefore, particularly advantageous in keeping the contacts engaged as long as the velocity conditions requiring engagement persist; and lateral flexibility of the plate 190h is important in this connection, as its springiness assures of maintenance of damping engagement with the shoes.

Spacing of the outer contacts 189, 189 from the movable contact 188 fixes the angle through which the gyro must precess to engage the contacts and the angle of precession is made proportional to turn velocity by means of the scale effect of the opposing centering springs. Therefore, by the choice of suitably light centering springs and by providing adjusting screws for the latter as well as for the contacts, it is assured that precessional motion shall occur over a relatively large angle for the minimum magnitude of turn velocity at which contact engagement is desired, and the requirement of minimum duration of turn velocity of the minimum magnitude is assured by the large angle and the opposing effect of damper friction.

While engagement of the movable contact 188 with either of the fixed contacts 189, 189 may be used to interrupt the erector magnet circuit 75 in any suitable manner, as shown, these contacts close a control circuit having a winding 191 for opening the normally-closed switch 192 in the circuit 75.

While the magnetic erector, including the magnet 73, in the event of deviation of the gyro spin axis from the vertical, applies torque to the gyro tending to precess the spin axis back to vertical, nevertheless rotation of the earth is a disturbing factor which becomes stronger as the equator is approached. Furthermore, with the erecting magnet circuit interrupted when making turns, there is no erecting force applied to the gyro. Therefore, there is provided means for exerting a torque in a north-south plane to counteract the effect of earth's rotation on the stable element gyro, this feature being desirable to obtain normal accurate positioning of the spin axis in the vertical and to avoid drifting of such axis away from the vertical when making turns.

To counteract the effect of earth's rotation on the gyro, the level or phantom, at 14, has a support 194 carrying a one-speed meridian synchro-motor SM₃ whose members have single-phase and three-phase windings 195a and 195b and are relatively movable to orient the armature 196 about the magnet 197 carried by the gyro in coaxial relation to the spin axis and whose winding is supplied by the circuit 198 from the direct current source L₀.

The train differential generator DG₃ (Fig. 21A)

interposed between the compass synchro-generator SG7 and the meridian synchro-motor SM8 and operated by the yoke assures that the synchro-motor will maintain the armature 196 in a north-south plane, it being remembered that such synchro-motor is carried by the stable element and that, to keep the armature positioned in a north-south plane, it is necessary to turn it relative to the stable element in the opposite direction and to the same extent as the latter is turned about the train axis. The train differential generator DG3 has a pair of members which are moved relatively by the yoke through the gearing, at 41, to secure one-speed operation. The members have three-phase windings 200 and 201 connected, respectively, by the conductors, at 203 and 204, to the three-phase output winding 157b of the one-speed compass synchro-generator SG7 and to the three-phase input winding 195b of the meridian synchro-motor SM8 for positioning the armature 196. Thus, there is provided means for keeping the armature element 196 in a north-south plane for any position in train of the stable element and for any ship's course. The effect of the attractive force of the armature and the magnet is to exert a moment on the gyro in the north-south plane and tending to move the spin axis on the east-west plane angularly at the same rate as that of the earth in that plane, with the result that, in relation to the earth, the spin axis is kept in the vertical.

To compensate for latitude changes, the bias exerted by the magnet 197 and the armature is varied, it being made stronger as the spin axis approaches a position normal to the earth's axis. Accordingly, a rheostat, at 205 (Fig. 21B) is arranged in the branch circuit 198 supplying the magnet winding 197 from the direct current supply line L3 to increase the magnetizing current in traveling toward the equator and vice versa.

Where the gyro, at 11, is pivotally supported from the cross level axis $x$—$x$, except as shown in Figs. 24 and 25, unless measures to the contrary are taken, friction at the bearings between the gyro gymbal ring 60 and the inner frame 59 would result in the application of disturbing torques to the gyro. Accordingly, as shown in Fig. 5, means cooperates with the pins 62 to avoid such undesired frictional effects. This purpose is accomplished by means of arms 208 attached to the pins 62 at their lower ends and having their upper ends provided with rollers 209 for engagement between guide surfaces 210 provided on guide structures 211 attached to the level or phantom, at 14. As the guide surfaces extend normally with respect to the cross level axis with the level in level condition and having a predetermined level axis plane normal to the spin axis, it will be apparent that the arms are operated to cause the pins 62 to move angularly with the level, at 14, when the latter moves about its axis and that they are free to move relative to the level for movements about the cross level axis. Were it not for these anti-friction arms 208, the pins 62 supporting the bearings 64 mounted in the gyro frame 59 would undergo rotation equal to the tilt of the cross level axis. In case of a steady list of a ship, and continuous rotation of the stable element about the train axis, the motion thus imparted to the bearings is oscillatory; however, as bearing rotation reverses when the whole system has rotated in train through 180 degrees, it will be apparent that the bearing friction always urges the gyro in the same sense in space. To avoid the effect of force so applied to the gyro, the latter is relieved of the duty of moving the bearing parts relatively, the arms 208 moved by the level being effective to move the pins 62 sufficiently to avoid the development of friction, that is, friction tending to develop because of relative motion between the frame 59 and the pins 62 is avoided by causing the pins 62 to move so as to avoid such relative movement, the necessary movement of the pins 62 for this purpose being effected due to the connections of the arms 208 with the level,, at 14, tending to move the pins angularly with the latter.

To minimize torques exerted on the gyro because of the cumulative spring forces of the contact leaves of the controlling or pick-up devices, at 84 and 85, there may be provided a load spring 213 (Fig. 5) arranged between abutments 214 and 215 carried by the inner frame 59 of the gyro and by the level, at 14, the spring having its axis inclined so as to exert forces effective about the transverse or tilt axes $x$—$x$ and $z_1$—$z_1$ of the gyro to neutralize partially the forces of the spring leaves, that is, as relative movement occurs with engagement of contact leaves. of a group, the moment exerted by the spring 213 about the axis with respect to which the engaging movement takes place becomes more and more as more and more contact leaves are engaged; however, in all cases, the effective force of the spring acting on the gyro and tending to engage contacts is less than the opposing spring force of the latter, otherwise the arrangement would be unstable because of negative spring stiffness.

The lower abutment 214 preferably has threaded connection with respect to the inner frame 59 and the upper abutment 215 is comprised by a threaded stem 216 engageable with a ball member 217 fitting the seat 218 provided on the level and held in engagement with the latter by means of a spring 219 whose outer end is retained by screws extending through the cylindrical wall 214. Because of the pivot point engagement of opposite ends of the spring 213 with the abutments 214 and 215, it will be apparent that, not only is it possible to secure relative axial adjustment of the abutments to vary the spring force, but, because of the ball and socket support for the upper stem 216 providing the upper abutment, the upper end of the spring may be adjusted in any direction so as to dispose its axis to vary the direction of the spring force acting on the gyro as well as the moment thereof.

In Figs. 24 and 25, instead of having pick-up devices, at 84 and 85, carried by the cross level 13 and the level 14, respectively, as in Figs. 1 to 11, inclusive, the controlling or pick-up devices, at 84a and 85a, are both carried by the level, at 14, the controlling or pick-up device, at 84a, including a pair of opposed groups of self-opening spring contact leaves 86a and 87a and the controlling or pick-up device, at 85a, has similar groups of contact leaves 99a and 100a, the contact leaves of the groups being engaged and disengaged by the actuator 225 coaxial with the spin axis and positioned by the gyro. As shown in Fig. 26, the actuator 225 is slotted, at 226, to provide for gripping of threaded contact members 227 carried thereby.

Contact operation is the same as that already described, the contacts 86a and 87a of the controlling or pick-up device, at 84a, being positioned so as to open and close in response to relative movement about the cross level axis $x$—$x$ to control the cross-level motor 34 to tilt the cross level with respect to the yoke, and the contacts 99a and 100a of the device, at 85a, being positioned at right angles to the contacts 86a and 87a so as to be effective in response to relative movement about the level axis $z$—$z$ to control the level motor 35 to tilt the level with respect to the cross level, tilting about the two axes being effected, as before, by the level and cross-level servo-motor systems to keep the level or phantom positioned in relation to the gyro vertical, that is, to keep the level horizontal.

As shown in Fig. 27, the circuits including the contacts 86a, 87a, 99a, and 100a each include the actuator 225 and the currents supplied thereby are first amplified by the amplifiers 229 and 230, with the result that the controlling currents may be weak enough to permit of such small and light contacts that the spring forces exerted on the gyro are of such small magnitude that a partially neutralizing spring 213, effective to reduce contact spring forces acting on the gyro, is not required.

Figs. 24 and 25, in addition to modification with respect to the contacts, also show a modified form of suspension, the gyro and erector gimbals 60 and 69 being pivotally mounted with respect to the level, instead of with respect to the cross-level pivot axis $x$—$x$, as in Figs. 1 to 11, inclusive. As shown, the gyro and gimbals are pivotally mounted with respect to the level pivot axis $z$—$z$; however, the position of the supporting axis of the gyro and erector gimbals with respect to the level may be altered so long as the gyro is effective with respect to the cross-level and level axes to control the servo-motor systems to keep the phantom positioned in relation to the vertical defined by the gyro spin axis, this capability being true whenever the gyro tilt axes, the spin axis and the cross-level and level axes intersect at a common point on the train axis. The modified contact arrangement, just described and shown in these views, is applicable to either type of suspension, as may be seen from such views and from Fig. 27.

Mounting the gyro and the erector on the stable element construction, aforesaid, by pivoting thereof with respect to the level pivot axis makes it necessary to modify the erector damper, the magnet means being carried by the level (Fig. 25) instead of by the cross level (Fig. 7) and being required to exert greater magnetic force because of the shorter lever arm radius necessitated by space limitations. Therefore, in Figs. 24 and 25, there are shown two magnetic dampers, at 78a, having the cores and windings 81a and 82a carried by the level, at 14, and acting on oppositely-extending arms 79b attached to the erector gimbal ring 69 and extending radially with respect to the level pivot axis $z$—$z$.

In Figs. 28, 29, and 30, there is shown a further modified form of the invention wherein cross-level and level servo-motor systems include alternating current cross-level and level motors 34b and 35b to cause the cross level and the level to move in a follow-up manner in response to operation of the control or pick-up devices, at 84b and 85b which are of suitable magnetic pick-up type, controlling, in response to movements in planes normal, respectively, to the cross level and level pivot axes, inputs to amplifiers 232 and 233, whose outputs are used to control the motors.

As shown, the control or pick-up devices at 84b and 85b, include, respectively, pairs of opposed inductor or pick-up transformers 234, 235 and 236, 237. Each transformer comprises primary and secondary windings 238 and 239 and a magnetic core 240. The primary windings are supplied from an alternating current source of suitable voltage and frequency. The opposed cores of the transformers 234 and 235, extending normally in relation to the cross-level axis, are arranged at right angles to the cores of the elements 236 and 237, which extend normally with respect to the level pivot axis. The inner ends of the cores have gaps or are relieved, as shown at 241 in Fig. 28, so that the magnetic path is completed through the collar 242 carried by the gyro coaxially of the spin axis, the arrangement being such that, if the collar moves in or out relative to a core, the flux is varied, in consequence of which the secondary voltage is varied, the flux and induced voltage increasing with inward movement and vice versa.

As shown, the cores of the transformers 234, 235, 236 and 237 are arranged normally with respect to radii extending from the intersection of the gyro axes and the collar 242 is dished in relation to the center of the gyro. Therefore, disturbances of the gyro because of force variations of the transformers are avoided since the moment arm of any such force is zero.

With movement of the control or pick-up device at 84b, in a plane normal to the cross-level axis, the output voltages of the transformers 234 and 235 are varied in opposite directions depending upon the direction of movement; and, as a result, the cross-level motor 34b is rendered operative in one direction or the other to move the cross level until the collar is positioned midway between the aligned cores. In like manner, relative movements of the collar and the elements 236 and 237 of the control or pick-up device, at 85b, result in follow-up operation of the motor 35b, until the mid position relation is restored.

As shown, the primaries 238 are connected in series and supplied from the line L1, through a suitable resistance 238a. The oppositely-wound secondaries 239 of opposed pick-up elements 234 and 235 are cross-connected and connected to the amplifier 232 whose output is furnished to the cross level motor 34b. The secondaries of the opposed pick-up devices 236 and 237 are similarly connected in relation to each other and to the amplifier 233 supplying the level motor 35b.

Any suitable alternating current cross-level and level motors 34b and 35b may be used. As shown, each of these motors is of the two-phase, subsynchronous type, the motor 34b having a pair of windings 232a and 232b and the motor 35b having a pair of windings 233a and 233b. The windings 232a and 233a are supplied from the secondary of a transformer 233c, whose primary is connected to the supply line L1. In operation, as long as the disc 242 is centered, the amplifiers 232 and 233 do not impress voltages on the windings 232b and 233b and the motors remain stationary; however, as the disc 242 moves from mid position in relation to the pick-up devices 234 and 235 and in opposite directions, voltage is impressed on the winding 232b and such voltage leads or lags with respect to that of the winding 232a, dependent upon the direction of departure of the disc from mid position, to cause the motor 34b to rotate in opposite directions with power output dependent upon the extent of departure. The level motor 35b is similarly operated in opposite directions due to relative movement of the disc 242 in relation to the pick-up devices 235 and 237.

As with the modifications previously described, the gyro spin axis is constrained to the vertical. As the elements 234, 235, 236 and 237 are mounted on the level, it will be apparent that the effect of the follow-up operations of the cross-level and level motors is to maintain the collar 242 in mid position relation with respect to opposed elements of the pairs 234, 235 and 236, 137. Since this centered relation exists only when a predetermined level pivot axis plane is normal to the spin axis, it necessarily follows that each motor is operated the required amount to keep the level horizontal.

To minimize nutational movement of the gyro, the inner frame or casing 59 is preferably provided, as shown in Figs. 5 and 12, with a damper, at 244, the damper comprising a casing 245 mounted on top of the inner frame 59 and providing an annular chamber 246 within which is located an annular inertia member or mass 247 preferably having an outer annular rib 248 at its lower side and adapted to bear on the bottom surface of the chamber. The inertia member or mass 247 has clearance with respect to the inner and outer peripheral walls 249 and 250 of the chamber as well as with respect to the top wall and the bottom wall, except for the rib bearing area. It will be apparent that inertia of the mass 247 is effective horizontally and rotationally, any movement of the casing being opposed by the inertia of the mass to the extent of the frictional resistance between the mass and the chamber bottom. Hence, the apparatus functions as a damper to dissipate or absorb vibrational energy by friction with the result that nutational effects are minimized.

Furthermore, the cross-level motors 34 and 34b, the level motors 35 and 35b, and the azimuth motor 36 are each preferably provided with dampers 252 (Fig. 13 and 14), each damper including a casing 253 carried by a motor shaft and providing a closed annular chamber 254 containing an annular inertia member or mass 255 having bearing relation, at 256, with respect to the motor shaft. The mass 255 has its side and peripheral faces defining suitably close clearance with respect to the chamber side and peripheral walls and the clearance space is filled with oil or other suitable liquid indicated at 257 (Fig. 13) and of desired viscosity. The inertia of the mass 255 should be two or three times that of the associated motor. The mass assures of greater uniformity of rotary motion of the associated motor and the mechanism operated thereby, and vibratory motions of a rotational or torsional character, particularly of higher frequencies, are absorbed frictionally. As damping is due to friction, it is a function of velocity. As the mass opposes change in rotational speed, it is particularly desirable for stable element operation at low roll speeds, as it provides for increased stiffness and minimizes any hunting effects.

The apparatus described operates as follows: The stable element is preferably located on the ship at or near the roll axis (Fig. 23) to minimize lateral acceleration effects and the yoke or train axis is arranged substantially normally in relation to the deck surface. As the gyro spin axis is constrained to vertical position, it controls the cross-level and level motors to tilt the cross level and the level sufficiently with respect to their pivot axes to maintain the level positioned in relation to the gyro, irrespective of training movement and regardless of variation in the inclination of the train axis due to roll and pitch, that is, with the gyro spin axis vertical, the level is maintained in level condition with a predetermined plane containing its axis normal to the spin axis or such that it has its axis horizontal and is horizontal with respect to the cross-level axis.

The yoke, cross level and level members, or the yoke and cross level members of the stable element are connected synchronously to corresponding members of other device or devices to assure of rotation of the latter in train with the stable element and of movements of the cross level and level members thereof about their pivot axes sufficiently to maintain the level members in level condition.

A neutral, three-degree freedom gyro is used to avoid acceleration effects and undesired precessional motion and oscillations, the necessary vertical constraint being imposed by an independently mounted pendulous erector, which, because the intersection of its outer and inner pivot axes is coincident with that of the gyro axes, is effective about the gyro center.

As the gyro spin axis is maintained in the vertical and the train axis is inclined in a variable manner due to rolling, pitching and listing of the ship, any change in inclination of the train axis results in movement of one or both of the cross-level or level pick-ups in relation to the gyro to control the cross-level and level motors to operate the latter in a follow-up manner to tilt the cross-level and level members so as to keep the level member level, it being remembered that the cross-level and level pick-ups are operated by movements in planes normal to the cross-level and level pivot axes $x$—$x$ and $y$—$y$, respectively. With the level in level condition, the actuating portion or portions of the rotor assembly coaxial with the rotor will be centered with respect to the cross-level and level pick-ups and departure of the latter from the centered relation, with the actuating portion or portions held vertical, results in one or both of the cross-level and level pick-ups becoming effective for operation of either or both of the cross-level and level motors until the actuating portion and pick-up centered relation is restored. In this connection, as shown with the modification illustrated in Figs. 1–11, disturbing torques imposed on the gyro because of stiffness of the pickups are reduced or partially neutralized by spring means applying torques to the gyro in opposition to the first torques.

The stable element may be trained in relation to the ship's course or independently thereof; and, if trained independently, the operation may be of the manual follow-up type or continuous at a desired speed for scanning. Further, if operated in relation to ship's course, additional control may be had for sighting.

Operation in relation to ship's course involves control of training of the stable element by the ship's compass (Figs. 21B and 22). As training with the train axis inclined necessarily involves tilting about the cross-level and level pivots arranged at right angles, angular variations would be introduced in the tilting movements in relation to the training movement. Deck tilt correction is, therefore, employed to avoid such variations, the necessary correction involving advancing or retarding movement of the yoke in train to the extent required for compensation. Therefore, the cross level, level, and train angles transmitted will be those required to keep the level members of other device or devices level and at the desired azimuthal angle regardless of roll and pitch.

Compass movement in relation to the ship is supplied as an input to the deck tilt corrector, which combines such input with its correcting effect to provide output for controlling the training motor. A manually-operable sighting or remote control device may be connected differentially between the compass and the deck tilt corrector and the manual operating means therefor. Due to the differential connection and the compass input, it will be apparent that adjustment in azimuth may be made to sight a target and that the line of sight will be preserved regardless of change in course and rolling and pitching of the ship. Furthermore, as an indicator is carried by the manual operating means, it will show the true azimuth.

To provide for manual follow-up training operation, a control transformer is manually operated in either direction through the angle desired to provide output for controlling the reversible training or azimuth motor to drive the yoke in opposite directions and a synchro-tie connection between the yoke and the control transformer assures that operation of the stable element in train will follow that of the control transformer. that is, the azimuth motor is thereby so controlled that it drives the stable element into positional agreement with the manual means for operating the transformer.

To provide for continuous scanning at suitable velocity, energy is supplied through a potentiometer to control the training motor.

The installation has two double-throw switches providing for any of the types of operation just mentioned. With the first switch engaging contact for "own ship's course" operation, the circuits for follow-up or continuous operation will be ineffective; and, with the first switch disengaged from said contacts and engaging its other contacts, the second switch is movable to render either the follow-up operation or the continuous one effective.

In turning. acceleration effects imposed by the erector on the gyro should be avoided and this is done by means responsive to turning of the ship to render the erector ineffective when the velocity and magnitude of turn both exceed desired amounts.

While the erector is adequate to hold the spin axis nearly vertical irrespective of the effect of earth's rotation, nevertheless, as the gyro is a neutral. three-degree freedom one, when the erector is inoperative, the spin axis would tend to maintain its relation with respect to space, the earth rotating relative to it. Drifting on this account, particularly when making turns with the erector ineffective. is avoided by the earth's rotation corrector. such apparatus involving means to apply force to the gyro in a north-south plane sufficiently to cause the spin axis to move angularly precessionally in the east-west plane to the same extent as the earth moves angularly in that plane, so that the spin axis may be maintained in the vertical. A latitude corrector provides for variation in said force suitably to the latitude.

Frictional dampers are used to minimize gyro nutational movements and to secure movement of the yoke, the cross level and the level more uniformly and without hunting effects.

The stable element or leveling mechanism operates to achieve the aforementioned operations by a relatively simple and self-contained mechanical arrangement of parts consisting principally of a yoke and its mounting means, a cross level, and a level and made possible by the arrangement of electrical features and relations thereof to the component parts providing for the training, cross level and level motors and synchro-generators being carried by the yoke mounting means, by the yoke, and by the cross level, respectively, by having a neutral gyro and an erector suspended in relation to the cross level and level so that, with the erector constraining the gyro to vertical position, the latter is ineffective in planes normal to the cross level and level axes to control the cross-level and level motors carried by the yoke and by the cross level for tilting the cross level and level with respect to their axis to position the level, by having a deck tilt corrector carried by the yoke and including members universally connected to the latter and to the ship so that relative angular movements of the members in a horizontal plane and in response to roll and pitch are effective to correct the train angle, that is, to enable the apparatus to have a directive capability which is correct in azimuth with respect to the vertical instead of an axis perpendicular to the ship with the level member or members positioned horizontally, by having the cross level and level axes and the gimbal axes of the stable element component of the deck tilt corrector in normal planes intersecting at the train axis with the intersections of the gyro axes, of the erector suspension axes and of the cross level and level axes coincident and on the train axis and with the intersection of the gimbal axes of the ship component of the deck tilt corrector on the train axis, located in normal planes which intersect at the train axis, and by having the features for controlling training movement, for rendering the pendulous erector ineffective to act on the gyro when turning, and for compensating for the effect of earth's rotation, all intimately combined, correlated and cooperating with the aforesaid features contributing to mechanical and electrical simplicity and self-containment with the capacity for dealing with all factors encountered in operation under service conditions.

It is to be understood that the terms "level" and "cross level" have the significance of "phantom" and "phantom ring," since the gyro is effective, through the servo-motor means, to secure the requisite follow-up movements about the cross-level and level axes to keep the level in its level condition with a predetermined plane of its axis normal to the spin axis, that is, horizontal with respect to the cross-level axis and having its (level) axis horizontal. Also, in many of the claims, "synchro-generator," "control transformer" and "differential generator" are used in the sense of referring either to a "coarse" or low-speed synchronous connection or to the latter taken with a "fine" or high-speed connection. Furthermore, it will be apparent that the cross level and level angles may be transformed directly into signal voltages supplied to receiver motors, or such angles may be used to modify or correct controlling voltages. In all cases, the purpose remains the same, namely, to transmit electrically the level and cross level angles. Therefore, the term "transmitter," as used herein, has the significance of any electrical means capable of transforming mechanical angular input into electrical output transformed by a receiver into an angular output corresponding to the angular input. In divisional application Serial No. 693,208, filed August 27, 1946, gyro features, such as the erector, the earth's rotation corrector, and the nutational damper, are claimed apart from any relations thereof to the leveling mechanism covered in the present application.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a stable element for a structure subject to rolling and pitching movements, a member mounted on the structure for movement about a training axis, means providing a reference vertical carried by said member, first and second pivotally-connected elements, means including a universal connection providing for movement of the first element in train with said member, means for universally connecting the second element to said structure so as to prevent movement of the second element in train with the first element relative to the structure, means utilizing the reference vertical to position said elements so that the plane of pivotal movement thereof is horizontal, a motor for moving said member about the training axis, and means responsive to relative angular movements of said elements with respect to their pivot axis and brought about by roll and pitch to control said motor.

2. In a stable element mounted on board ship, a supporting structure movable about a training axis, a cross level pivotally supported from the supporting structure, a level pivotally supported from the cross level, a motor for moving the supporting structure about a training axis, means for moving the cross level and the level about their supporting axes so as to maintain the level member level, and means for correcting the training movement of said supporting structure for roll and pitch; said correcting means comprising a pair of pivotally-connected elements, a first gimbal ring pivotally connected to the supporting structure about an axis parallel to the cross level axis and pivotally connected to one of said elements about an axis at right angles to the first axis, a second gimbal ring pivotally connected to the ship about an axis parallel to the keel axis and pivotally connected to the other of said elements about an axis at right angles to the first axis, means for maintaining said pivotally-connected elements in parallel relation with respect to the level, and means responsive to relative angular movements of said elements occasioned by roll and pitch to control the motor.

3. In a stable element for a structure subject to rolling and pitching movements, a yoke; means for mounting the yoke on the structure and providing for movement thereof about a training axis; a cross level; a level; means for pivotally connecting together the yoke, the cross level and the level so that the cross level is movable about a cross level axis and the level is movable about a level axis with the cross level axis arranged at right angles both to the training axis and to the level axis; servo-motor means for moving the cross level and the level with respect to their axes; a neutral gyro having outer and inner tilt axes with the inner tilt axis at right angles to the spin axis and the outer tilt axis; pendulous means acting on the gyro to cause the spin axis to seek a vertical position; means for suspending the pendulous means about outer and inner axes arranged at right angles; means utilizing the gyro to control the servo-motor means for level positioning of the level; train servo-motor means for controlling the position in train of the yoke; and means including first and second pivotally-connected members which are relatively movable with respect to their pivot axis in response to roll and pitch of the structure to control the train servo-motor means to correct the train angle, means for pivotally connecting the first member to the yoke through inner and outer axes at right angles with the outer axis parallel to the cross level axis, means for maintaining the inner axis parallel to the level axis, and means for pivotally connecting the second member to the structure through inner and outer axes at right angles with the outer axis arranged parallel to one of the roll and pitch axes of the structure.

4. In a stable element for use on board ship and the like, a yoke; means for mounting the yoke on the ship for movement about a training axis; a cross level; a level; means for pivotally connecting together the yoke, the cross level and the level so that the cross level is movable about a cross level axis and the level is movable about a level axis with the cross level axis arranged at right angles to the training axis and to the level axis; servo-motor means for moving the cross level and the level about their axes; a neutral gyro having an inner tilt axis arranged at right angles to the spin axis and to an outer tilt axis; means including an electro-magnet which is universally and pendulously supported with respect to the intersection of the gyro axes and which is effective to cause the gyro to urge the spin axis toward the vertical; means utilizing the gyro to control the servo-motor means to position the level; servo-motor means for moving the yoke in train; and apparatus for controlling the train servo-motor means to position the yoke in train and including means for correcting for pitch and roll; said correcting means including pivotally-connected first and second members, means universally connecting the first member for movement in train with the yoke, means universally connecting the second member to the ship so as to avoid movement thereof in train with the first member and relative to the ship, means for positioning said members to maintain the plane of relative movement thereof parallel to the level, and means responsive to relative angular movement of the first and second members with respect to their pivot axis and in response to roll and pitch for controlling the train servo-motor means.

5. In a stable element for use on board ship and the like, a yoke; means for mounting the yoke on the ship for movement about a training axis; a cross level; a level; means for pivotally connecting together the yoke, the cross level, and the level so that the cross level is movable about a cross level axis and the level is movable about a level axis with the cross level axis arranged at right angles to the training axis and to the level axis; servo-motor means for moving the cross level and the level about their axes; a neutral gyro having an inner tilt axis arranged at right angles to the spin axis and to an outer tilt axis; means including an electromagnet which is universally and pendulously supported with respect to the intersection of the gyro axes and which is effective to cause the gyro to urge the spin axis toward the vertical; means utilizing the gyro to control the servo-motor means to position the level; servo-motor means for moving the yoke in train; apparatus for controlling the train servo-motor means to position the yoke in train and including means for correcting for pitch and roll; said correcting means including pivotally-connected first and second members, means universally connecting the first member for movement in train with the yoke, means universally connecting the second member to the ship so as to avoid movement thereof in train with the first member and relative to the ship, means for positioning said members to maintain the plane of relative movement thereof parallel to the level, and means responsive to relative angular movement of the first and second members with respect to their pivot axis and in response to roll and pitch for controlling the train servo-motor means; and means effective to correct for the effect of earth's rotation on the gyro and including electro-magnet and armature elements, one of said elements being carried by the gyro in co-axial relation with the spin axis and the other of said elements being carried by the level and being movable about the first element and said elements being arranged so that, when the electromagnet element is energized, attractive force is exerted therebetween to cause the gyro to precess, means effective to position the movable one of said elements so that the gyro has precessional movement in an east-west plane at the same angular rate and in the same direction as that of rotation of the earth, and means for varying the energizing current supplied to the electro-magnet so as to equalize the rates of said angular movements to neutralize the effect of earth's rotation on the gyro.

6. The combination as claimed in claim 5 with means for interrupting the suppy of energizing current to the pendulous electro-magnet in response to turn velocity of such minimum magnitude and minimum duration that interruption on account of yaw is avoided.

7. In a stable element for a ship provided with a compass having a pivotal connection with respect thereto about an axis parallel to the keel axis, a member mounted on the ship for movement about a training axis, means providing a reference vertical carried by said member, first and second pivotally-connected elements, a universal connection between the first element and the member and providing for movement thereof in train with the latter, means for pivotally connecting the second element to the ship through inner and outer axes at right angles with the outer axis arranged parallel to the keel axis, means utilizing the reference vertical to position said elements so that the plane of relative pivotal movement thereof is horizontal, a reversible motor for moving said member about its training axis, means utilizing the compass to control the motor to position the member in train, and means responsive to relative angular movements of said elements with respect to their pivot axis and brought about by roll and pitch to control said motor to correct the train angle.

8. In a stable element for a ship provided with a compass having a pivotal connection with respect thereto about an axis parallel to the keel axis, a member mounted on the ship for movement about a training axis, means providing a reference vertical carried by said member, first and second pivotally-connected elements, a universal connection between the first element and the member and providing for movement thereof in train with the latter, means for pivotally connecting the second element to the ship through inner and outer axes at right angles with the outer axis arranged parallel to the keel axis, means utilizing the reference vertical to position said elements so that the plane of relative pivotal movement thereof is horizontal, a reversible motor for moving said member about its training axis, means utilizing the compass to control the motor to position the member in train, means responsive to relative angular movements of said elements with respect to their pivot axis and brought about by roll and pitch to control said motor to correct the train angle, and manually-operable means for controlling the motor to effect training adjustment of said member in relation to the compass.

9. In a stable element mounted on structure provided with a compass, a yoke; means for mounting the yoke for movement about a train axis; a cross level; a level; means for pivotally connecting together the yoke, the cross level, and the level so that the cross level is movable about a cross level axis and the level is movable about a level axis with the cross level axis arranged at right angles to the training axis and to the level axis; servo-motor means for moving the cross level and the level with respect to the cross level and level axes; a gyro having its spin axis constrained to vertical position for controlling the servo-motor means to position the level; servo-motor means for moving the yoke in train; a synchro-generator including exciter and output windings; means utilizing the compass and the structure for effecting relative movement of said windings; a control transformer including input and output windings with the input winding connected to the synchro-generator output winding and with the output winding connected to supply controlling voltage to the train servo-motor means; said windings of the control transformer having a normal in-phase relation such that no voltage is generated in the output winding and relative movement of the synchro-generator windings operating to produce out-of-phase relation thereof to generate controlling voltage for the train servo-motor means; means providing a follow-up connection between the yoke and the input winding of the control transformer and responsive to movement in train of the yoke to restore the in-phase relation of the windings of the latter; and means for correcting for the earth's rotation on the gyro comprising a magnet carried by the latter, a synchro-motor including a stator and a rotor, an armature carried by the rotor and disposed laterally of the magnet and cooperating with the latter to exert attractive force causing the application of a couple to the gyro to precess the latter, said stator including an exciter winding and said rotor including an input winding, a differential generator having windings connected, respectively, to said synchro-generator output winding and to the synchro-motor input winding, and means for effecting relative movement of the differential generator windings in response to training movement of the yoke in order that the armature element may be positioned in relation to the magnet so as to cause precession of the gyro compensating for the effect of earth's rotation.

10. The combination as claimed in claim 9 with a second differential generator interposed in the connection between the synchro-generator and the control transformer and including input and output windings, respectively, to the synchro-generator output winding and to the control transformer input winding and means for effecting angular displacement of the input and output windings of the second differential generator to produce out-of-phase relation of the windings of the control transformer to an extent dependent upon such displacement and consequent movement of the yoke in train accompanied by restoration of the in-phase relation of the control transformer windings.

11. In a stable element mounted aboard a ship provided with a compass supported thereon through inner and outer axes at right angles with the outer axis parallel to the keel axis, a yoke; means for mounting the yoke for movement about a training axis; a cross level; a level; means for pivotally connecting together the yoke, the cross level, and the level so that the cross level is movable about a cross level axis and the level is movable about a level axis with the cross level axis arranged at right angles to the training axis and to the level axis; servo-motor means for moving the cross level and the level with respect to the cross level and level axes; a gyro; means for constraining gyro spin axis to vertical position; means utilizing the gyro to control said servo-motor means to position the level; servo-motor means for moving the yoke about its training axis; a synchro-generator having an exciter winding and an output winding which are moved relatively due to relative movement of the compass and ship; a deck tilt corrector comprising a pair of pivotally-connected members, means for connecting one of said members to the yoke through outer and inner axes at right angles with the outer axis arranged parallel to the cross level axis, means for maintaining the inner axis parallel to the level axis, means for connecting the other of said members to the ship through an outer axis parallel to the keel axis and an inner axis at right angles thereto, and a control transformer including input and output windings which are moved relatively by said members; means connecting the input winding of the control transformer to the output winding of the synchro-generator; and means for connecting the output winding of the control transformer to the train servo-motor means to control the latter.

12. In a stable element for a ship provided with a compass mounted thereon by means of a gimbal whose pivots with respect to the ship have an axis parallel to the keel axis, a yoke; means for mounting the yoke for training movement about an axis normal to the deck plane; a cross level; a level; means for pivotally connecting together the yoke, the cross level, and the level so that the cross level axis is arranged at right angles both to the training axis and to the level axis; servo-motor means for moving the cross level and the level with respect to the cross level and level axes; a gyro; means for constraining the gyro spin axis to vertical position; means utilizing the gyro to control said servo-motor means to position the level; means including synchro-generators carried by the mounting means, by the yoke, and by the cross level for effecting training, cross level, and level movements of a suitable device or devices; a synchro-generator operated by the compass and including exciter and output windings; a deck tilt corrector comprising a pair of pivotally-connected members, means for connecting one of said members to the yoke through outer and inner axes at right angles with the outer axis arranged parallel to the cross level axis, means for maintaining the inner axis parallel to the level axis, means for connecting the other of said members to the ship through an outer axis parallel to the keel axis and an inner axis at right angles thereto, and a control transformer including input and output windings which are rotated relatively by said members; means for connecting the output winding of the compass synchro-generator to the input winding of the control transformer; first output terminals for the control transformer output winding; manually-operable controlling means including a synchro-generator connected to the yoke and including exciter and output windings, a second control transformer including relatively rotatable input and output windings, manual means for effecting relative rotation of the latter windings, means for connecting the yoke synchro-generator output winding to the input winding of the second control transformer, and second output terminals for the output winding of the second control transformer; a supply line, third output terminals, and resistance means between the supply line and the terminals; and switching means for connecting any of said first, second and third terminals to the train servo-motor means to control the latter.

13. The combination as claimed in claim 3 with the intersections of the gyro axes, of the outer and inner suspension axes of the pendulous means, and of the outer and inner axes of said first and second members on the train axis defined by the intersection of normal planes containing the cross level and level axes and the inner and outer axes of said first member.

14. In combination, a stable element construction comprising a yoke rotatable about a train axis, a cross level member pivotally connected to the yoke about a cross level axis, and a level member pivotally connected to the cross level member about a level axis; said cross level axis being at right angles both to the train and level axes; a neutral gyro including a housing, a rotor carried by the housing, and gimbal means for supporting the housing from said stable element construction, means responsive to gravity and acting on the lower portion of the gyro to cause constraint of the spin axis to vertical position; motors carried by the yoke and by the cross level member for moving the cross level and the level members about the cross level and level axes; means for controlling said motors including pick-up devices carried by the level member and an actuating member for the pick-up devices; said pick-up devices being arranged for operation by movements in planes normal to the cross level and level axes and the actuating member being carried by the gyro housing in axial alignment with the rotor spin axis; means for moving the yoke about the train axis; a cylindrical magnet carried by said actuating member above the pick-up devices and axially aligned with the rotor spin axis; an armature element cooperating with the magnet so that magnetic attractive force may be exerted on the gyro about an axis transverse to the spin axis; means including a motor for mounting the armature on the level member for movement about the magnet; means for controlling the motor so that the magnetic attractive force is effective to exert torque on the gyro in a north-south plane; and variable means for energizing the magnet so that the torque exerted on the gyro in the north-south plane causes the gyro to precess in the east-west plane sufficiently to maintain the rotor spin axis vertical.

15. In leveling and training mechanism for use on board ship or the like, including a level, and being operative to provide for arcuate movement of the level in a horizontal plane relative to the ship; a yoke; yoke mounting means for attachment to the ship and providing for angular movement of the yoke about a train axis; a level and cross-level aggregate comprising a cross-level pivotally carried by the yoke and said level pivotally carried by the cross-level; the pivot axis of the cross-level extending normally both with respect to the train axis and the level axis aid said axes intersecting at a common point; reversible servo-motor means including cross-level and level motors carried by the yoke and by the cross-level for driving the cross-level and the level, respectively, about their pivot axes; a neutral gyro comprising a rotor assembly including a rotor and a frame within which the latter is journalled together with gimbal means for supporting the assembly from said aggregate with the intersections of the gyro axes and of the train, cross-level and level axes coincident; a pendulous member carried by said aggregate and arranged for pendulous movement with respect to said coincident intersections of the axes; said pendulous member including means having clearance with respect to said rotor and cooperating with the latter to develop force applied thereto to cause the spin axis to seek a vertical position; an earth's rotation corrector acting on the gyro; an azimuth motor for driving the yoke about the train axis; means actuated by a portion or portions of the gyro coaxial with the rotor for controlling the cross-level and level servo-motor means and responsive to movements of the cross-level and the level about their pivot axes and relative to the spin axis to render the cross-level and level motors effective to maintain the level in level condition irrespective of movement in train of the latter and of rolling and pitching of the ship; and apparatus for controlling operation of the azimuth motor.

16. The combination as claimed in claim 15 with means responsive to turning of the ship in excess of a predetermined amount and at a speed in excess of a predetermined velocity to render the means carried by the pendulous member ineffective to cooperate with the rotor to develop force applied to the latter.

17. The combination as claimed in claim 15 wherein the earth's rotation corrector is comprised by magnetic means acting in the meridian on the gyro together with means for maintaining the meridian position of the magnetic means irrespective of change in course of the ship.

18. The combination as claimed in claim 15 wherein the earth's rotation corrector is comprised by magnetic means acting in the meridian on the gyro together with means for maintaining the meridian position of the magnetic means irrespective of change in course of the ship, and means providing for adjustment of the magnetic means to suit the latitude.

19. The combination as claimed in claim 15 with means responsive to turning of the ship in excess of a predetermined amount and at a speed in excess of a predetermined velocity to render the means carried by the pendulous member ineffective to cooperate with the gyro rotor to develop force applied to the latter; magnetic means effective, when in meridian position, to act on the gyro to compensate for the effect of earth's rotation thereon; means for maintaining the meridian position of the magnetic means irrespective of change of course of the ship; and means providing for adjustment of the magnetic means to suit the latitude.

20. The combination as claimed in claim 15 wherein the means for controlling the cross level and level servo-motor means includes pick-ups arranged quadrantally in diametrically-opposed pairs of cross-level and level pick-ups cooperating with the actuating portion or portions, said actuating portion or portions having centered relation with respect to the pairs when the level is disposed with its axis in a plane which is horizontal and normal to a vertical plane containing the cross-level axis and the pick-ups responding to departure from said centered relation for operation of the cross-level and level servo-motor means until the centered relation is restored.

21. The combination as claimed in claim 20 wherein departure of the pick-ups from centered relation with respect to the actuating portion or portions occurs with stiffness imposing disturbing moments on the gyro together with spring means acting between the frame of the rotor assembly and the level and operating to impose moments on the gyro opposing the first moments so as to partially neutralize the latter.

22. In leveling mechanism for use on board ship; a yoke; yoke mounting means for attachment to the ship and providing for rotary movement of the yoke about a train axis; a level and cross-level aggregate comprising a cross-level pivotally carried by the yoke and a level pivotally carried by the cross-level, the pivot axis of the cross-level extending normally both with respect to the train axis and the level axis and said axes intersecting at a common point; reversible cross-level and level servo-motor systems including cross-level and level motors carried by the yoke and the cross-level for driving the cross-level and the level, respectively, about their pivot axes; a neutral gyro including a rotor and means including gimbal mechanism for supporting the rotor from said aggregate with the intersections of the gyro axes and of the train, cross-level and level axes coincident; a pendulous member carried by said aggregate and arranged for pendulous movement with respect to said coincident intersections of the axes; said pendulous member including a magnet having clearance with respect to the rotor and, when energized, cooperating with the latter to develop force applied thereto to cause the spin axis to seek a vertical position; an energizing circuit for said magnet; an azimuth motor for driving the yoke about the train axis; means actuated by a portion of the gyro aligned with the spin axis for controlling the cross-level and level motors and responsive to movements of the cross-level and level about their axes and relative to the spin axis to render the cross-level and level motors effective to maintain the level in level condition irrespective of movement in train of the latter and of rolling and pitching of the ship; apparatus for controlling the operation of the azimuth motor; and means responsive to the turning of the ship in excess of a predetermined amount and at a speed in excess of a predetermined velocity to interrupt the energizing circuit of said magnet to render the latter ineffective to cooperate with the rotor to develop force applied to the latter.

23. The combination as claimed in claim 15 wherein the apparatus for controlling the azimuth motor includes variable means to cause the motor to drive the yoke in train at a desired speed.

24. The combination as claimed in claim 15 wherein the apparatus for controlling the azimuth motor includes means comprising a member movable manually in opposite directions to cause the motor to drive the yoke in train in a follow-up manner with respect to the member.

25. The combination as claimed in claim 15 wherein the apparatus for controlling the azimuth motor includes means responsive to change in direction of the ship for controlling the motor to drive the yoke so as to preserve the angular relation of said cross-level and level aggregate in azimuth with respect to the meridian.

26. The combination as claimed in claim 15 wherein the apparatus for controlling the azimuth motor includes means responsive to roll and pitch of the ship to control the motor to drive the yoke to compensate the latter for roll and pitch errors of the cross-level and level aggregate in azimuth and means responsive to change in direction of the ship for controlling the motor to drive the yoke so as to preserve the angular relation of said aggregate in azimuth with respect to the meridian.

27. The combination as claimed in claim 15 wherein the apparatus for controlling the azimuth motor includes means responsive to change in direction of the ship to control the motor to drive the yoke so as to preserve the angular relation of said cross-level and level aggregate in azimuth with respect to the meridian and means for manually adjusting the last-named means to vary said angular relation.

28. The combination as claimed in claim 15 wherein the apparatus for controlling the azimuth motor includes means responsive to roll and pitch of the ship to control the motor to drive the yoke to compensate the latter for roll and pitch errors of the cross-level and level aggregate in azimuth, means responsive to change in direction of the ship to control the motor to drive the yoke so as to preserve the angular relation of said aggregate in azimuth with respect to the meridian, and means for manually adjusting the last-named means to vary said angular relation.

29. The combination as claimed in claim 15 wherein the apparatus for controlling the azimuth motor includes first means responsive to roll and pitch of the ship to control the motor to drive the yoke to compensate for roll and pitch errors of said cross-level and level aggregate in azimuth, second means responsive to change in direction of the ship to control the motor to drive the yoke so as to preserve the angular relation of said aggregate in azimuth with respect to the meridian, third means for manually adjusting the last-named means to vary said angular relation, fourth means for controlling the motor to drive the yoke in train at a desired speed, fifth means comprising a member movable manually in opposite directions to cause the motor to drive the yoke in train in a follow-up manner with respect to the member, and means manually operative to selectively render said second, fourth and fifth means effective.

30. Apparatus as claimed in claim 15 with level, cross-level and train synchronous transmission systems respectively including tranmitters carried by the cross-level, the yoke and the mounting means for the yoke and mechanically operated respectively by the level, cross-level and the yoke in response to movements thereof about the level, cross-level and train axes.

31. Apparatus as claimed in claim 15 with cross-level and train synchronous systems including transmitters carried by the mounting means for the yoke and by the yoke and operated mechanically by the yoke and by the cross-level, respectively, in response to movements of the yoke and of the cross-level about the train and cross-level axes.

32. The combination as claimed in claim 15 wherein the gimbal mechanism of the gyro is supported from the aggregate about the cross-level axis together with means responsive to movement of the level about the level axis to secure movement together of the components of the bearings between the gimbal means and the frame of the rotor structure to avoid the development and application to the gyro of disturbing friction moments.

CLINTON R. HANNA.
LAWRENCE B. LYNN.

REFERENCES CITED

The following references are of record in the file of this patent:

UNITED STATES PATENTS

| Number | Name | Date |
| --- | --- | --- |
| 1,679,354 | Fairchild et al. | Aug. 7, 1928 |
| 1,731,776 | Henry | Oct. 15, 1929 |
| 1,733,531 | Dugan | Oct. 29, 1929 |
| 1,840,104 | Anschutz-Kaempfe | Jan. 5, 1932 |
| 1,988,458 | Minorsky | Jan. 22, 1935 |
| 1,998,939 | Mittag | Apr. 23, 1935 |
| 2,014,825 | Watson | Sept. 17, 1935 |
| 2,236,340 | Marggraf | Mar. 25, 1941 |
| 2,385,204 | Hanna | Sept. 18, 1945 |

FOREIGN PATENTS

| Number | Country | Date |
| --- | --- | --- |
| 33,738 | Netherlands | Oct. 15, 1934 |

Certificate of Correction

Patent No. 2,457,228. December 28, 1948.

CLINTON R. HANNA ET AL.

It is hereby certified that errors appear in the printed specification of the above numbered patent requiring correction as follows:

Column 17, line 30, for the word "bearing" read *bearings*; column 23, line 15, for the numeral "137" read *237*; column 26, line 20, for "ineffective" read *effective*; column 33, line 19, claim 15, for "aid" read *and*;

and that the said Letters Patent should be read with these corrections therein that the same may conform to the record of the case in the Patent Office.

Signed and sealed this 31st day of May, A. D. 1949.

[SEAL]

THOMAS F. MURPHY,
*Assistant Commissioner of Patents.*